US006970719B1

(12) United States Patent
McConnell et al.

(10) Patent No.: US 6,970,719 B1
(45) Date of Patent: Nov. 29, 2005

(54) PRIVATE WIRELESS NETWORK INTEGRATED WITH PUBLIC WIRELESS NETWORK

(75) Inventors: Von K. McConnell, Leawood, KS (US); Mark Yarkosky, Overland Park, KS (US); Baoquan Zhang, Overland Park, KS (US); Thomas M. Sladek, Overland Park, KS (US); Kenneth C. Jackson, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 835 days.

(21) Appl. No.: 09/595,595

(22) Filed: Jun. 15, 2000

(51) Int. Cl.[7] .................................................. H04B 1/38

(52) U.S. Cl. ................... 455/554.1; 455/560; 455/561; 379/221.09

(58) Field of Search ................................ 455/554, 555, 455/435.1, 439, 413, 432.3, 550.1, 552.1, 455/553.1, 554.1, 554.2, 556.1, 561, 435.2, 455/422.1, 426.1, 426.2; 379/156, 157, 158, 379/167.1, 201.01

(56) References Cited

U.S. PATENT DOCUMENTS

| | | | | |
|---|---|---|---|---|
| 4,599,490 | A | 7/1986 | Cornell | |
| 4,680,786 | A | 7/1987 | Baker | |
| 5,537,610 | A | 7/1996 | Mauger | |
| 5,583,916 | A | 12/1996 | Mäenpää | |
| 5,594,718 | A | 1/1997 | Weaver, Jr. | |
| 5,594,777 | A | 1/1997 | Makkonen | |
| 5,600,705 | A | 2/1997 | Mäenpää | |
| 5,670,950 | A | 9/1997 | Otsuka | |
| 5,734,699 | A * | 3/1998 | Lu et al. | 455/422.1 |
| 5,745,852 | A | 4/1998 | Khan | |
| 5,761,620 | A | 6/1998 | Furuya | |
| 5,771,275 | A | 6/1998 | Brunner | |
| 5,799,250 | A | 8/1998 | Veloso | |
| 5,818,824 | A | 10/1998 | Lu | |
| 5,839,067 | A | 11/1998 | Jonsson | |
| 5,870,677 | A | 2/1999 | Takahashi | |
| 5,887,256 | A | 3/1999 | Lu | |
| 5,890,064 | A * | 3/1999 | Widergen et al. | 455/445 |
| 5,890,069 | A | 3/1999 | Evans | |

(Continued)

OTHER PUBLICATIONS

Uyless Black, "Mobile and Wireless Networks", Chapter 15, pp. 332-333, 1996.

(Continued)

*Primary Examiner*—Edward F. Urban
*Assistant Examiner*—Thuan Nguyen

(57) ABSTRACT

A private wireless network is able to provide wireless telecommunication services to subscriber mobile stations that also subscribe to a public wireless network. The private wireless network includes a private base transceiver station (BTS), a private mobile switching center (MSC), and a gateway service control point (SCP). The private BTS provides a private network wireless coverage area within which the mobile station can communicate with the base transceiver station over an air interface. The gateway SCP has a private network database containing private network data records for subscribing mobile stations. A private network data record includes a private network service profile and a private network locator address. The public wireless network has a home location register (HLR) with a public network database containing public network data records for subscribing mobile stations. A public network data record includes a public network service profile and a public network locator address. When a subscriber mobile station is active on the private wireless network, the private network locator address identifies the private MSC, and the public network locator address identifies the gateway SCP. By providing the private network wireless coverage area so that it overlaps the public network's wireless coverage area, the subscriber mobile station may be handed off between the private and public wireless networks.

13 Claims, 26 Drawing Sheets

U.S. PATENT DOCUMENTS

| | | | | |
|---|---|---|---|---|
| 5,911,120 | A | 6/1999 | Jarett | |
| 5,913,166 | A | 6/1999 | Buttitta | |
| 5,924,030 | A | 7/1999 | Rautiola | |
| 5,950,125 | A | 9/1999 | Burhrmann | |
| 5,953,651 | A | 9/1999 | Lu | |
| 5,956,652 | A | 9/1999 | Eriksson | |
| 5,978,672 | A * | 11/1999 | Hartmaier et al. | 455/413 |
| 5,978,687 | A | 11/1999 | Mäenpää | |
| 5,995,843 | A | 11/1999 | Sjödin | |
| 5,999,813 | A | 12/1999 | Lu | |
| 6,094,479 | A | 7/2000 | Lindeberg et al. | |
| 6,181,935 | B1 * | 1/2001 | Gossman et al. | 455/433 |
| 6,301,474 | B1 * | 10/2001 | Hartmaier et al. | 455/417 |
| 6,317,594 | B1 * | 11/2001 | Gossman et al. | 455/414.1 |
| 6,622,016 | B1 * | 9/2003 | Sladek et al. | 379/201.01 |

OTHER PUBLICATIONS www.agcs.com/roameo, AG Communication Systems, (1999).

* cited by examiner

PRIVATE NETWORK
HANDSET A- MOVING ON CAMPUS
64
PRIVATE MSC-A
60
CURRENT SERVING MSC
GATEWAY SCP
70
PRIVATE MSC-B
160
TARGET PRIVATE MSC TO HAND-OFF
MOBILE STATION SENDS PRIVATE MSC-B A CDMA CHANNEL SELECTION REQUEST TO SERVING MSC-A
1050
FACILITIES DIRECTIVE
1052
FACILITIES DIRECTIVE RR
1054
MOBILE ON CHANNEL
1056
REGNOT
1058
REGNOT RR
1060
REGCAN
1062
REGCAN RR
1064

PRIVATE WIRELESS NETWORK INTEGRATED WITH PUBLIC WIRELESS NETWORK

BACKGROUND OF THE INVENTION

1. Field of the Invention

The present invention relates in general to telecommunications networks and more particularly to a private wireless network that is integrated with a public wireless network.

2. Description of Related Art

Recent advances in telecommunications technology have allowed a wide array of special telecommunication services to be made available to subscribers. Examples of such services include abbreviated dialing, which allows a subscriber to reach a party by dialing less than the entire telephone number of that party, call forwarding, in which calls directed to the subscriber may be forwarded to another line, terminating call screening, which allows the subscriber to specify certain times during which all or selected incoming calls are to be rejected, and originating call screening, in which calls to certain telephone numbers are barred. In general, enhanced telecommunications services ("services") encompass those call features that do more than simply place or terminate telephone calls as dialed.

To enable such services, telecommunications networks typically carry "signals," as well as the voice or data comprising the conversation between the calling party and the called party. These signals monitor the status of the lines, indicate the arrival of incoming calls, and carry the information needed to route the voice or other data through the network. At one time, these signals were inband, i.e., the signals were transmitted through the same circuits as used for voice transmission. However, most telecommunications networks now use out-of-band signaling, i.e., the signals are transmitted over a signaling network separate from the circuit-switched network that carries voice and data. Thus, signals carried on the separate signaling network are used to control the switches in the circuit-switched network to set up and tear down the circuit between the calling party and called party. Currently, Signaling System 7 ("SS7") is the most commonly used signaling system.

In previous decades, the switches themselves provided the special telecommunications services. However, the switches had to have a great deal of "intelligence" built into them to accomplish this. In particular, a typical switch included a database of control information and call processing logic, in addition to switching capabilities. This approach was unwieldy because a telecommunications provider needed to update the software and databases on all of its many switches in order to update services or add new services throughout its telecommunications network. To complicate matters, the software needed to program switches from different vendors often differed greatly.

To overcome these limitations, most telecommunications networks in the Unites States have adopted the advanced intelligent network ("AIN") approach. The advent of AIN has improved matters in two ways. First, most of the control information and call processing logic, usually referred to as "service logic," resides in a central network location, the service control point ("SCP"), instead of in the multitude of switches. Second, AIN provides a set of standardized messages between the switches and the SCP to allow for a variety of services. These standards are embodied in Bellcore's AIN Release 0.1 and AIN Release 0.2.

The benefit of having the call control functions in a centralized SCP is that changes made at the SCP will apply to a large number of switches. This makes changing services and adding new services much easier and reduces the problem of differences in switches from different vendors. Moreover, the centralization at the SCP and the standardized message set allows an SCP to control a large number of switches, which are referred to as service switching points ("SSPs") in AIN parlance, even those from different vendors. Indeed, in the AIN approach, the switches can be quite generic but still able to provide a variety of services. This is because, instead of the SSPs themselves having the necessary call processing logic, the SSPs signal the SCP for guidance at predefined "trigger points" in the call processing. The triggers can occur either when the SSP is attempting to originate a call or attempting to terminate a call. The query signal from the SSP passes a set of relevant parameters, in a predefined format, to the SCP. Such parameters can include the calling party's telephone number and the called party's telephone number, for example. When the SCP receives the query, it executes the appropriate service logic and consults the appropriate databases to obtain the information and instructions needed to provide the intelligent network service. The SCP then sends a response message to the SSP instructing it how to complete the call to provide the service.

Because of the large number of SSPs and other network elements connected to the signaling network, the signaling network typically includes one or more signal transfer points ("STPs") that route the signals through the signaling network. Thus, the signals between SSPs and other SSPs or the SCP are often routed through one or more STPs. When SS7 signaling is used, signals may be routed to specific network elements based on their point codes. Alternatively, signals may be routed using Global Title Translation ("GTT"), in which STPs route signals to their intended destinations without the need for point codes. In particular, when GTT is used, STPs route signals based on information contained in their payloads.

Wireless telecommunications networks have also been developed on a similar model. In wireless networks, switching is performed by mobile switching centers (MSCs). Each MSC typically controls one or more base stations or base transceiver stations (BTSs), sometimes via one or more base station controllers (BSCs). Each BTS provides a wireless coverage area within which mobile stations can communicate with the BTS over an air interface. The mobile stations can be cellular or PCS telephones, or other devices. Different formats may be used for communicating over this air interface. At present, the most commonly used formats in the United States are Advanced Mobile Phone Service (AMPS), Time Division Multiple Access (TDMA), Global System for Mobile Communications (GSM), and Code Division Multiple Access (CDMA).

Each mobile station typically has a "home" wireless network, in which a home location register (HLR) serves as a centralized repository of information about the mobile station. Typically, the HLR contains a service profile for the mobile station, the last reported location of the mobile station, and the current status of the mobile station, such as whether it is active or inactive. The service profile indicates which enhanced services the mobile station subscribes to.

Mobile stations typically identify themselves to wireless networks using one or more types of identification numbers. Each mobile station typically has a 10-digit Mobile Identification Number (MIN). The MIN may be, but need not be, the same as the directory number that would be dialed to reach the mobile station. Thus, a mobile station may also have a Mobile Directory Number (MDN) different from its MIN. Each mobile station also typically has a unique 32-bit Electronic Serial Number (ESN).

When an MSC needs to find information about a mobile station, such as where it is located or what services it subscribes to, it queries the HLR corresponding to that mobile station. Thus, to inquire about a mobile station that is roaming, i.e., operating on a network other than its home network, the MSC queries an HLR that is outside of its network. Typically, these queries are routed to the appropriate HLR based on the mobile station's MIN and/or MDN. For example, the MSC may reference internal translation tables to determine which HLR to query for which MINs and/or MDNs. Alternatively, STPs may route queries to the appropriate HLR using GTT, based on either MIN or MDN.

In a manner analogous to the AIN approach used in wireline networks, an MSC may also query a Wireless Intelligent Network (WIN) SCP for call processing instructions, in the course of either originating a call from or terminating a call to the mobile station. Such queries can arise from trigger points set by the mobile station's service profile that the MSC downloaded from the mobile station's HLR. Moreover, an MSC uses such queries to obtain the call processing instructions needed to provide enhanced telecommunications services to the mobile station. In response to such queries, the WIN SCP will typically execute the appropriate service logic and consult the mobile station's service profile to formulate the call processing instructions that the WIN SCP then sends to the MSC.

The Telecommunications Industry Association/Electronics Industry Association (TIA/EIA) has developed a number of interim standards that specify how this signaling between MSCs, HLRs, WIN SCPs, and other network elements, should occur. In particular, most wireless networks in the United States use one of the revisions of TIA/EIA Interim Standard 41 ("IS-41"). The IS-41 signaling is typically run as an application on another signaling system, such as SS7. A recent revision of this Interim Standard, ANSI-41 Rev. D, which was published in July, 1997, is fully incorporated herein by reference. Furthermore, extensions to ANSI-41D or WIN triggers and WIN call processing are included in Interim Standard IS-771, which was published July, 1999, and is fully incorporated herein by reference.

In addition to public wireline and wireless networks, businesses and other organizations (collectively referred to herein as "enterprises") have been using private telecommunications networks for many years. Such networks are "private" in that the subscribers are typically limited to employees of, or other individuals associated with, the enterprise. For example, many enterprises have used private wireline switching systems, such as private branch exchanges (PBXs), to switch calls to and from telephones in the enterprise's office area. Such private telecommunications networks advantageously allow an enterprise greater control over its telecommunications system and enable the enterprise to customize the telecommunications it provides to its subscribers. For example, the enterprise can set up an abbreviated dialing plan for the private network, in which the subscriber telephones can reach one another by dialing an abbreviated digit string. In another typical service, calls to subscriber telephones that are not answered are sent to a voice mail system.

Private telecommunications networks have also been provided with wireless capability. In particular, there have been developed various wireless office telephone systems ("WOTS") that provide for wireless communication in a, typically, limited geographic area, such as a building or campus. See, e.g., Lawrence Hart, et al., "Cellular and PCS: The Big Picture," p. 183–232 (1997). However, many such WOTS systems require specialized telephones, so that a standard cellular or PCS telephone that can be used in a public wireless network may not work in a given WOTS system. With many people routinely carrying a cellular or PCS telephone, requiring a different telephone to be used at work is a substantial inconvenience.

To overcome this disadvantage, some wireless office systems have been developed in accordance with the TIA's IS-94 specifications. The IS-94 specifications allow the same handsets to be used in both private cellular systems, e.g., wireless office systems, and public cellular systems. However, IS-94 is not designed to handoff calls between the private and public cellular systems. The lack of handoff capability is a significant disadvantage. In particular, if a user moves out of the limited coverage area of the wireless office system during the course of a call, the call may be dropped.

Some wireless office systems, however, have some limited ability to allow users to move between the private and public cellular networks during the course of a call. An example is the ROAMEO in-building wireless telephone system that is sold by AG Communication Systems, headquartered in Phoenix, Ariz. The ROAMEO system is provided as an adjunct to a company's existing PBX, Centrex, or key system and allows standard wireless telephones to act as wireless extensions of the existing office desktop telephones. If a user originates a call in the public wireless network and then moves into the building served by the ROAMEO system during the course of the call, the call will continue using the public wireless network (provided the signal from the public wireless network is able to penetrate into the building). Moreover, once the call is ended, the telephone is automatically registered on the ROAMEO system. However, if a call is originated within the coverage area of the ROAMEO system, it may be dropped if the telephone leaves the ROAMEO coverage area.

Widergen, et al., U.S. Pat. No. 5,890,064 discloses a wireless office system that is said to be integrated into both a private telephony network and a public cellular system. Certain of the disclosed embodiments are said to support handover of ongoing calls between cells of the wireless office system and the public cellular system. The wireless office system includes a wireless office gateway and a radio access network to provide wireless communications to corporate mobile terminal, which are part of a corporate group of terminals of the private telephony network. The public cellular system includes an HLR/SCP, which, in turn, includes a home location register (HLR) and a Service Controller Function (SCF). The SCF can store a user profile for each subscriber. The wireless office system communicates with the HLR to provide mobility management for the corporate mobile terminals and communicates with the SCF to provide intelligent network services for the corporate mobile terminals.

A disadvantage with this configuration, however, is that many users may already have a cellular telephone for personal use and may be disadvantaged by having to use a separate "corporate mobile terminal" for business. In particular, it would be advantageous for many users to have one mobile telephone that could be used for both personal and business calls. Moreover, with respect to enhanced telecommunications services, a user may desire a different set of services for personal calls than for business calls. However, the Widergen approach of using the HLR/SCP to serve the corporate mobile terminals in both the private and public networks does not facilitate the application of separate business and personal services.

SUMMARY OF THE INVENTION

In a first principal aspect, the present invention provides a private wireless network, to which private network mobile stations subscriber, integrated with a public wireless network, to which public network mobile stations subscribe. The private wireless network is able to provide wireless telecommunications services to at least one mobile station that subscribes to the private wireless network and to the public wireless network. The public wireless network has a public network subscriber database containing a public network data record for each of the public network mobile stations, including a first data record for the at least one mobile station. The private wireless network comprises at least one base station, a switching system in communication with the at least on base station, and a private network subscriber database accessible by the switching system. The at least one base station provides a private network coverage area in which the at least one mobile station can communicate with the at least one base station over an air interface. The private network subscriber database contains a private network data record for each of the private network mobile stations, including a second data record for the at least one mobile station.

In a second principal aspect, the present invention provides a method for mobility management of a mobile station that subscribes to both a private wireless network and a public wireless network. The private wireless network has a base station able to communicate with the mobile station over an air interface, a switching system in communication with the base station, a gateway in communication with the switching system, and a private network database accessible by the gateway. The private network database contains a first data record for the mobile station. The public wireless network has a home location register containing a second data record for the mobile station. In accordance with the method, the mobile station transmits a registration request message to the base station over an air interface. The gateway receives a first registration notification message identifying the mobile station. The gateway then transmits a second registration notification message to the home location register, which message identifies the mobile station.

In a third principal aspect, the present invention provides a method for handing off a mobile station being served by a serving system in a private wireless network to a target system in a public wireless network. The public wireless network has a home location register that includes a public network subscriber database containing a first data record for the mobile station. The first data record includes a first locator address for locating the mobile station. The private wireless network has a gateway in communication with the serving system and a private network subscriber database accessible by the gateway. The private network subscriber database contains a second data record for the mobile station. The second data record includes a second locator address for locating the mobile station. The second locator address identifies the serving system. In accordance with the method, the home location register receives from the target system a registration notification message identifying the mobile station, and the home location register transmits to the gateway a first registration cancellation message identifying the mobile station.

In a fourth principal aspect, the present invention provides a method for handing off a mobile station being served by a serving system in a public wireless network to a target system in a private wireless network. The public wireless network has a home location register that includes a public network subscriber database containing a first data record for the mobile station. The first data record includes a first locator address for locating the mobile station. The first locator address identifies the serving system. The private wireless network has a gateway in communication with the serving system and a private network subscriber database accessible by the gateway. The private network subscriber database contains a second data record for the mobile station. The second data record includes a second locator address for locating the mobile station. In accordance with the method, the gateway receives from the target system a first registration notification message identifying the mobile station, and the gateway transmits to the home location register a second registration notification message identifying the mobile station.

In a fifth principal aspect, the present invention provides a method for delivering a voice mail indication to a mobile station that subscribes to a private wireless network and to a public wireless network. The private wireless network has a gateway and a computer telephony interface (CTI) in communication with the gateway. The gateway includes a private network subscriber database containing a first data record for the mobile station. The private wireless network also has a private network serving system for serving the mobile station when it is operating in a private network wireless coverage area. The public wireless network has a home location register that includes a second data record for the mobile station. The public wireless network also has a public network serving system for serving the mobile station when it is operating in a public network wireless coverage area. In accordance with the method, the CTI transmits to the gateway a first voice mail notification message identifying the mobile station. If the mobile station is operating in the private network wireless coverage area, then the gateway transmits to the private network serving system a second voice mail notification message identifying said mobile station, and, in response, the private network serving system causes a first voice mail indication to be transmitted to the mobile station.

In a sixth principal aspect, the present invention provides a method for providing call origination services to a mobile station that subscribes to a private wireless network and to a public wireless network. The private wireless network has a private network serving system for serving the mobile station when it is operating in a private network wireless coverage area. The public wireless network has a public network serving system for serving the mobile station when it is operating in a public network wireless coverage area. The private wireless network has a first service control point (SCP), and the public wireless network having a second service control point (SCP). In accordance with the method, if the mobile station is operating in the private network wireless coverage area, then: (1) the private network serving system transmits a first call origination query to the first SCP; (2) the first SCP transmits a second call origination query to the second SCP; (3) the second SCP executes service logic to formulate first call processing instructions; (4) the second SCP transmits to the first SCP a first response message containing the first call processing instructions; and (5) the first SCP transmits to the private network serving system a second response message containing the first call processing instructions.

In a seventh principal aspect, the present invention provides a method for providing call termination services to a mobile station that subscribes to a public wireless network. The private wireless network has a mobile switching center (MSC) and a first service control point (SCP). The public wireless network has a second SCP. In accordance with the method, in response to receiving a request to terminate a call to the mobile station, the MSC transmits a first call termination query to the first SCP. The first SCP transmits to the MSC a first response message identifying the second SCP. The MSC then transmits a second call termination query to the second SCP. The second SCP executes service logic to formulate call processing instructions. The second SCP then transmits to the MSC a second response message containing the call processing instructions.

In an eight principal aspect, the present invention provides a method for updating at least one telecommunications feature available to a mobile station that subscribes to a private wireless network and to a public wireless network. The private wireless network has a private network serving system for serving the mobile station when it is operating in a private network wireless coverage area, and the public wireless network has a public network serving system for serving the mobile station when it is operating in a public network wireless coverage area. The private wireless network has a gateway service control point (SCP) that includes a private network subscriber database containing a first service profile for the mobile station. The public wireless network has a home location register (HLR) that includes a public network subscriber database containing a second service profile for the mobile station. In accordance with the method, the mobile station transmits a signal containing a feature code, and, if the mobile station is operating in the private network wireless coverage area, then: (1) the private network serving system transmits a first feature request message to the gateway SCP; (2) the gateway SCP updates the first service profile for said mobile station; (3) the gateway SCP transmits a second feature request message to the HLR; and (4) the HLR updates the second service profile for the mobile station.

These as well as other advantages of the present invention will become apparent to those of ordinary skill in the art by reading the following detailed description, with appropriate reference to the accompanying drawings.

DETAILED DESCRIPTION OF AN EXEMPLARY EMBODIMENT

Figure 1:
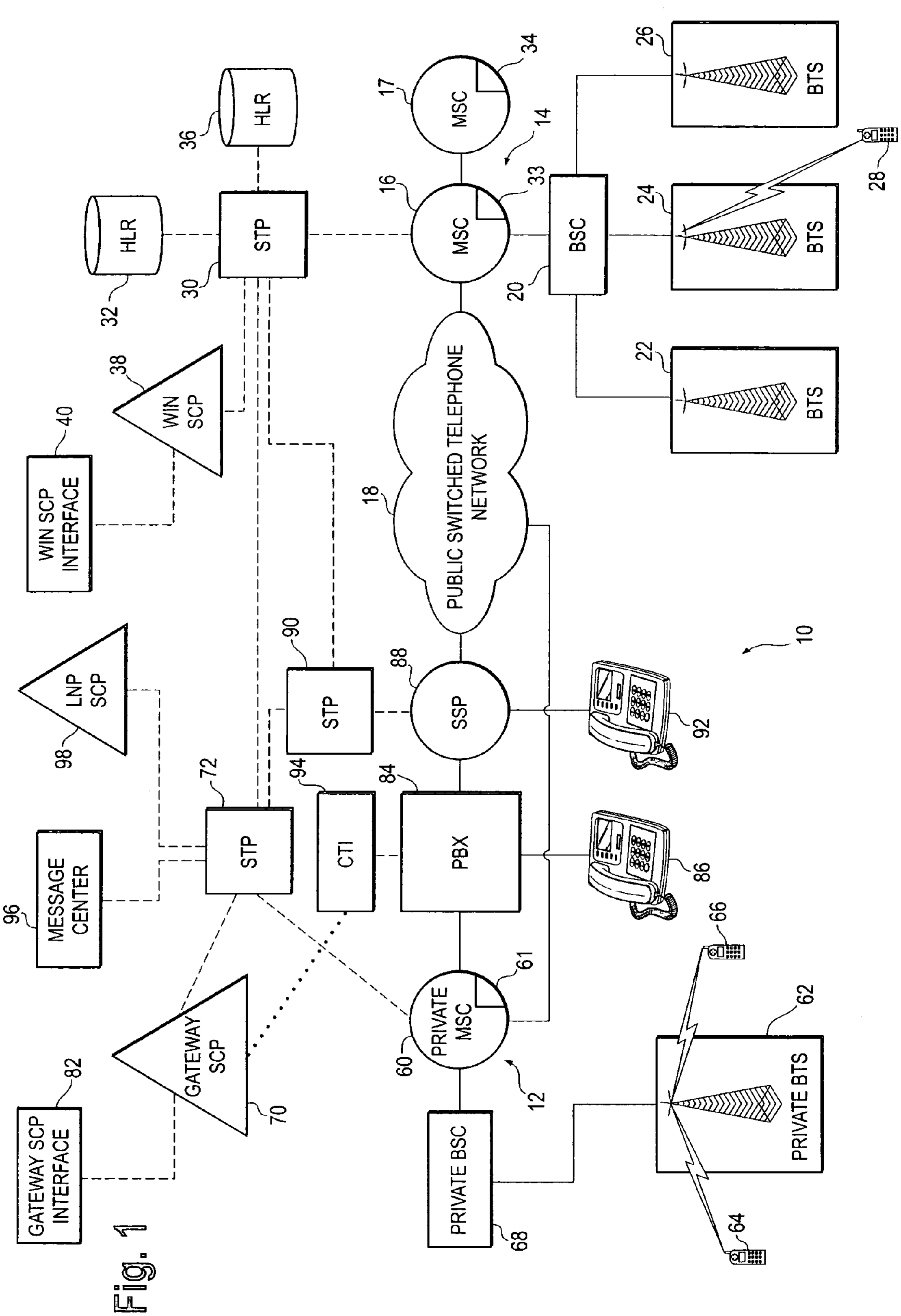
FIG. 1 is a block diagram of a private wireless network integrated with a public wireless network, in accordance with an exemplary embodiment of the present invention.

FIG. 1 shows a functional block diagram of a telecommunications network 10 that includes a private wireless telecommunications network 12 integrated with a public wireless telecommunications network 14, in accordance with an exemplary embodiment of the present invention. In FIG. 1, logical connections and signaling pathways are represented by dashed lines, and circuit-switched connections for voice, data, and other traffic are represented by solid lines. Public wireless network 14 provides wireless telecommunications services, in a particular geographic coverage area, to its subscribers and, typically, to other wireless networks' subscribers who are roaming in the coverage area of network 14. Typically, any interested member of the public meeting minimal criteria may become a subscriber of public wireless network 14. Additionally, the coverage area of public wireless network 14 is typically wide-ranging. For example, the coverage area of network 14 may encompass a metropolitan area, a substantial part of a metropolitan area, or several metropolitan areas.

In contrast, private wireless network 12 typically provides wireless telecommunications services in only a very limited geographic area and only to its subscribers. In particular, the coverage area of private wireless network 12 may be limited to a single building, to part of a building, or to a complex of buildings. Private wireless network 12 may be used by only a particular enterprise, such as a business or other organization, and the subscribers of network 12 may be limited to the enterprise's employees or others specifically authorized by the enterprise.

The wireless communications provided by private wireless network 12 and public wireless network 14 may be in a format, such as AMPS, TDMA, GSM, CDMA, or some other format. Preferably, networks 12 and 14 use the same format. Most preferably, networks 12 and 14 use CDMA. Details of a preferred CDMA air interface are set forth in the ANSI/TIA/EIA-95-B-99 standard, published by the Telecommunications Industries Association/Electronic Industries Association (TIA/EIA), which standard is fully incorporated herein by reference.

As described in more detail below, private wireless network 12 is provided with an SCP that serves as a "gateway," between private network 12 and public network 14. In particular, this Gateway SCP intermediates much of the signaling between the network elements in private network 12 and the HLR in public network 14. For example, the Gateway SCP receives many of the signals from the HLR in public network 14 on behalf of private network 12, thereby acting in certain ways as a "virtual VLR" to public network 14. However, Gateway SCP also typically includes a private network subscriber database for the mobile stations that subscribe to private network 12, thereby serving in certain ways as a "private HLR." The Gateway SCP enables private network 12 to be "integrated" with public wireless network 14, in exemplary embodiments. In particular, the present invention beneficially enables a subscriber of private wireless network 12 to use the same mobile station, or "handset," for wireless communication in the coverage area of public wireless network 14 as the subscriber uses for wireless communication in the coverage area of private wireless network 12. Additionally, in preferred embodiments, the present invention beneficially allows calls to or from private network subscribers to be handed off between private network 12 and public network 14. In this way, if, during the course of a call, the private network subscriber moves from the coverage area of private network 12 to the coverage area of public network 14, or vice versa, the call will not be dropped.

On the other hand, in preferred embodiments, much of the traffic of private network 12 will typically be calls internal to private network 12, which calls result in little or no traffic increase on public network 14. Thus, by making a capital investment to put private network 12 in place, an enterprise may obtain lower periodic expenses for telecommunications services. Further, public wireless network operators may expand their subscriber bases by building out into the private wireless networks of the present invention, with only modest increases to the load on public network 14.

As shown in FIG. 1, public wireless network 14 includes a mobile switching center (MSC) 16 that is connected to the public switched telephone network (PSTN) 18 and another MSC 17 connected to PSTN 18 via MSC 16. Public wireless network 14 also includes a base station controller (BSC) 20, connected to MSC 16, and base transceiver stations (BTSs) 22, 24, and 26, connected to BSC 20. Each of BTSs 22, 24, and 26 is provided with one or more antennas to define a wireless coverage area, which is termed a "cell." In addition, BTSs 22–26 may use directional antennas to define a plurality of "sectors" within each cell. Within its wireless coverage area, each of BTSs 22, 24, and 26 is able to communicate with one or more mobile stations, such as mobile station 28, over an air interface. Mobile station 28 may be a cellular or PCS telephone, a personal digital assistant, or other device that transmits or receives voice, data, or other media over an air interface.

Although FIG. 1 shows only two MSCs, i.e., MSCs 16 and 17, public wireless network 14 typically includes a large number of MSCs. Further, although FIG. 1 shows only a single BSC, i.e., BSC 20, connected to MSC 16, each MSC in public wireless network 14 is typically connected to a plurality of BSCs. Finally, although three BTSs, i.e., BTS 22, 24, and 26, are shown connected to BSC 20, a BSC in public wireless network 14 may be connected to a greater or fewer number of BTSs.

Each of BTSs 22, 24, and 26 typically perform radio resource management tasks for its given coverage area. BSC 20, in turn, typically manages the power levels and frequencies transmitted by the BTSs under its control, e.g., BTSs 22–26, and may also control handoffs between these BTSs. MSC 16 is typically responsible for switching calls. For example, MSC 16 may switch calls between the BSCs to which it is connected, such as BSC 20, other MSCs in public network 14, and the PSTN 18. Typically, MSC 16 also performs the signaling needed to originate and terminate calls to the mobile stations in the coverage area of public wireless network 14. To allow the signaling needed to route calls through PSTN 18, and to communicate with other elements of public wireless network 14, MSC 16 is typically connected to one or more STPs, such as STP 30.

Although BSC 20 is shown as an element separate from MSC 16 and from BTSs 22–26, BSC 20 may, alternatively, be co-located with either MSC 16 or one of BTSs 22–26. Alternatively, BSC 20 may not be used at all, in which case its functions will typically be performed by MSC 16.

Public wireless network 14 includes a Home Location Register (HLR) 32 and at least one Visitor Location Register (VLR). Preferably, each MSC in public network 14, such as MSC 16 and MSC 17, has its own VLR 33 and 34, respectively, that keeps track of the mobile stations that are operating in, or have recently operated in, the areas controlled by that MSC. VLRs 33 and 34 are preferably attached to, or a part of, the MSCs 16 and 17. Alternatively, VLRs 33 and 34 may be remote from MSCs 16 and 17, in which case MSCs 16 and 17 may communicate with VLRs 33 and 34 using a signaling system, such as IS-41.

HLR 32 stores information for each mobile station that subscribes to public wireless network 14. In particular, each mobile station subscribing to network 14 has a corresponding data record in HLR 32. A mobile station's data record typically includes a service profile and status information for that mobile station. Typically, the data records in HLR 32 are indexed by the mobile stations' MIN and/or MDN. The service profile lists the services the mobile station subscribes to in public wireless network 14. The service profile may also include one or more triggers, such as WIN triggers, to provide enhanced telecommunications services, as described in more detail below. The status information typically specifies whether the mobile station is active, i.e., is registered with a wireless network, or inactive, i.e., not currently registered with any known wireless network. If the mobile station is active, the status information also typically includes a locator address that identifies the network element that last reported the mobile station's location. In IS-41, the locator address is typically the point code of a VLR or MSC. A mobile station's locator address tells network how to route calls or other information, such as short messages, to that mobile station. Thus, HLR 32 serves as a centralized repository of key information about its subscribing mobile stations.

Typically, HLR 32 is physically separate from MSC 16, in which case MSC 16 communicates with HLR 32 by using a signaling system, such as IS-41, and the signals are typically routed through one or more signal transfer points (STPs), such as STP 32. MSC 16 is also typically able to communicate with other HLRs, such as HLR 36, that serve other wireless telecommunications networks. For example, MSC 16 may communicate with HLR 36 in order to obtain information about mobile stations that are roaming, i.e., mobile stations that are operating in the coverage area of network 14 but that do not subscribe to network 14. MSC 16 may communicate with HLR 36 via one or more STPs, such as STP 30, using a signaling system, such as IS-41.

As described in more detail below, when a mobile station registers with public wireless network 14, MSC 16 downloads its service profile into VLR 33. If the mobile station is a subscriber of public wireless network 14, then MSC 16 will typically obtain its service profile from HLR 32. If the mobile station subscribes to some other wireless network, then MSC 16 will typically obtain its service profile from the HLR for that other wireless network. Once a mobile station's service profile is in VLR 33, MSC 16 may refer to it to determine how to process calls involving that mobile station.

Public wireless network 14 may also include a service control point (SCP), such as WIN SCP 38 to provide enhanced telecommunications services to mobile stations. MSC 16 is able to communicate with WIN SCP 38, via one or more STPs, such as STP 30, using an appropriate signaling system, such as IS-771. As described in more detail below, when MSC 16 detects a trigger during call processing, which indicates that enhanced telecommunications services may be implicated, MSC 16 sends a query message to WIN SCP 38, via STP 30. WIN SCP 38 then responds with the call processing instructions needed to provided the enhanced telecommunications service.

WIN SCP 38 is typically provided with one or more interfaces, such as WIN SCP interface 40. Interface 40 may allow control over and provisioning of WIN SCP 38. Interface 40 may include a service creation environment (SCE) to allow service logic to be created, tested, and downloaded to WIN SCP 38. Interface 40 may also allow information to be retrieved from WIN SCP 38, such as to generate reports.

Figure 2:
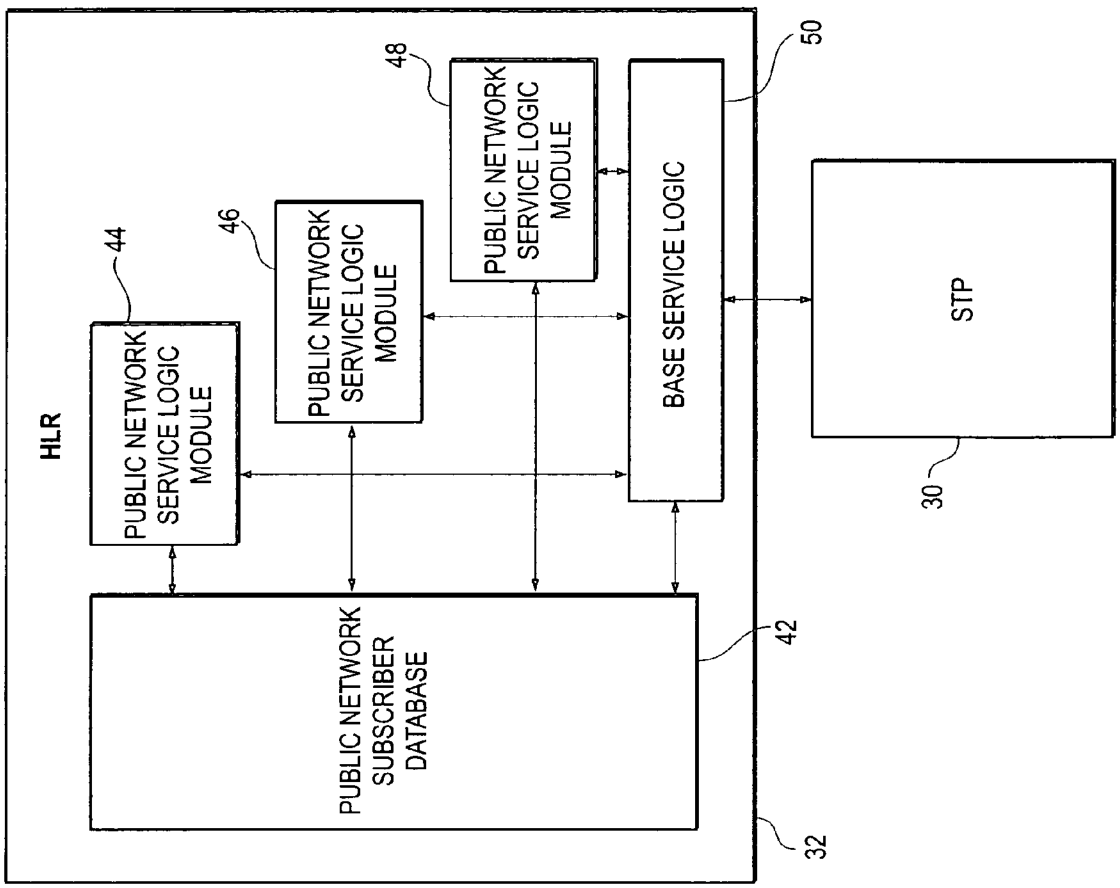
FIG. 2 is a functional block diagram of the HLR of FIG. 1, in accordance with an exemplary embodiment of the present invention.

FIG. 2 provides a more detailed illustration of the functional components of HLR 32. In FIG. 2, double-headed arrows indicate the most important logical or signaling connections between the components. HLR 32 includes a public network subscriber database 42 that contains the data records of each mobile station subscribing to public network 14, as described above. HLR 32 may also include a plurality of service logic modules, such as service logic modules 44–48. Although three service logic modules are shown in FIG. 2 for purposes of illustration, it is to be understood that HLR 32 can include a greater or fewer number. Service logic modules 44–48 include software specifying how to provide telecommunications services, such as IS-41 wireless telecommunications services. HLR 32 also typically includes a base service logic module 50 that includes the service logic needed to communicate with other network elements, such as STP 30. Base service logic module 50 is able to access subscriber database 42 to obtain information about mobile stations requested by other network elements, such as VLR 33. Base service logic module 50 may also access database 42 and may execute one or more of service logic modules 44–48 to formulate call processing instructions to other network elements, such as MSC 16.

Like HLR 32, WIN SCP 38 also typically includes a base service logic module, a plurality of service logic modules, and a public network subscriber database. However, whereas HLR 32 typically executes its service logic modules to provide IS-41 telecommunications services, WIN SCP 38 typically executes its service logic modules to provide IS-771 services. Alternatively, the IS-41 and IS-771 service logic modules may be provided in the same network element, or the various service logic modules may be distributed in various ways among a plurality of network elements. Moreover, in some embodiments, the public network subscriber database may be located in the same network elements as one or more service logic modules, whereas, in other embodiments, the public network subscriber database may be located in a network element that lacks any service logic modules.

With reference to FIG. 1, private wireless network 12 includes a private MSC 60, having access to a VLR 61, and a private BTS 62 that is controlled by private MSC 60. Private BTS 62 is provided with a distributed antenna array to define a wireless coverage area within which private BTS 62 can communicate with mobile stations, such as mobile stations 64 and 66, over an air interface. Mobile stations 64 and 66 may be cellular or PCS telephones, personal digital assistants, or other devices able to transmit or receive voice, data, or other media over an air interface. Private wireless network 12 may also include a private BSC 68. Alternatively, private BSC 68 may be co-located with either private MSC 60 or with private BTS 62, or private BSC 68 may be omitted entirely.

Preferably, the wireless coverage area provided by private network 12 overlaps the wireless coverage area provided by public network 14. For example, the wireless coverage area provided by private BTS 62 may overlap with the wireless coverage areas provided by one or more of BTSs 22–26. Additionally, mobile stations 64 and 66 are preferably able to communicate with public wireless network 14, as well as private wireless network 12, to facilitate handoffs.

Private MSC 60 includes a switching functionality to switch calls among mobile stations in the coverage area of private wireless network 12. Preferably, private MSC 60 also includes VLR 61 for the mobile stations operating in the coverage area of private network 12. Alternatively, VLR 61 may be provided by a separate network element accessible by private MSC 60.

HLR functionality for private wireless network 12 is preferably provided by a Gateway SCP 70. Gateway SCP 70 may be in a location remote from the enterprise served by network 12. Alternatively, Gateway SCP 70 may be provided as an application on a computer, such as a personal computer, located at or near the enterprise served by network 12. Private MSC 60 is able to communicate with Gateway SCP 70 either directly, or via one or more STPs, such as STP 72, using a signaling system, such as IS-41.

Figure 3:
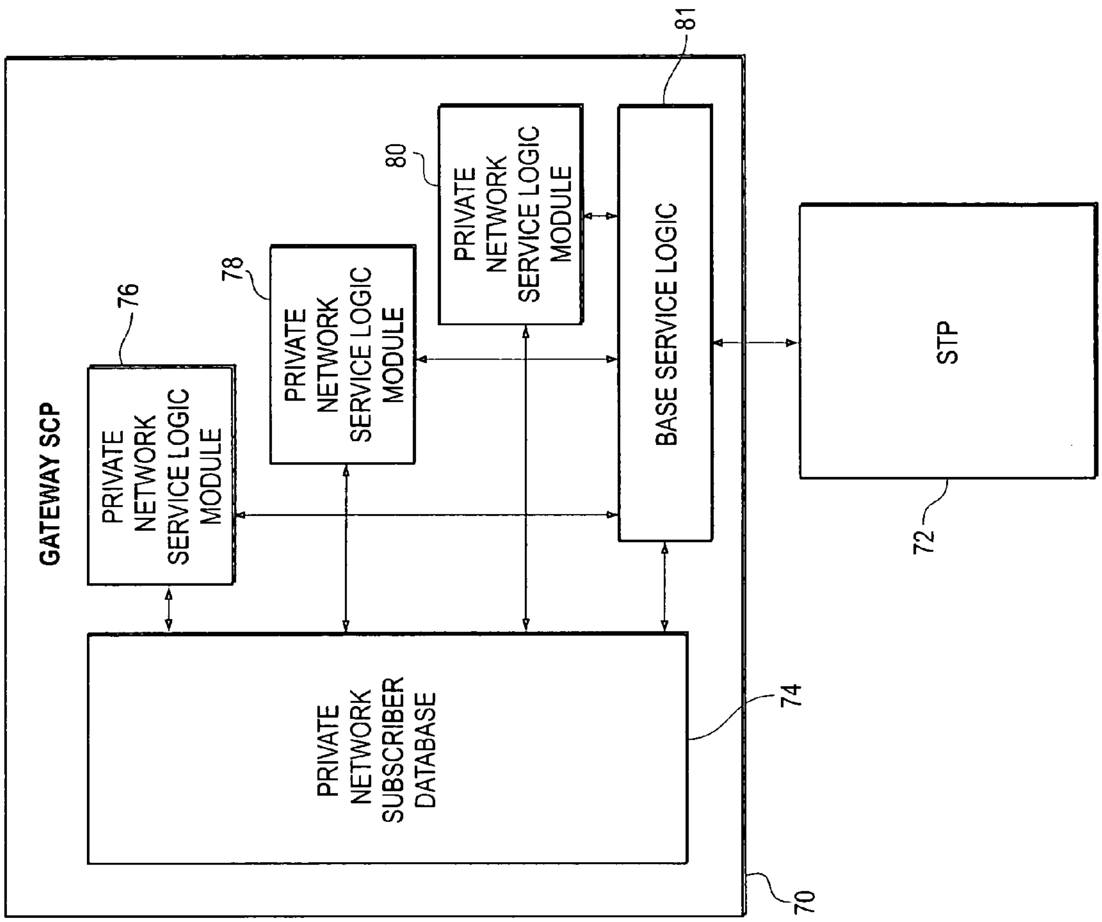
FIG. 3 is a functional block diagram of the Gateway SCP of FIG. 1, in accordance with an exemplary embodiment of the present invention.

FIG. 3 provides a more detailed illustration of the functional components of Gateway SCP 70. As shown in FIG. 3, Gateway SCP 70 includes a private network subscriber database 74 that contains information for each mobile station that subscribes to private network 12. The information in database 12 for each mobile station is typically similar to that provided for each mobile station listed in an HLR, such as HLR 32. Thus, each mobile station subscribing to private wireless network 12, would typically have a data record in database 74, preferably indexed by MIN and/or MDN. Typically, the data record would include a service profile listing the enhanced services to which the mobile station subscribes on private network 12, status information, such as whether the mobile station is active or inactive, and a locator address identifying the network element that last reported the mobile station's location. Gateway SCP 70 also typically includes a plurality of service logic modules, such as service logic modules 76–80. Although FIG. 3 shows three service logic modules for purposes of illustration, Gateway SCP 70 may include a greater or fewer number of service logic modules. Service logic modules 76–80 contain the software needed to provide the wireless telecommunications services of private network 12, including enhanced telecommunications services. Preferably, service logic modules 76–80 include the software needed to provide both IS-41 and IS-771 services. Gateway SCP 70 also includes a base service logic module 81 that contains the service logic needed to communicate with other network elements, such as STP 72. Moreover, base service logic module 81 formulates the call processing instructions to other network elements, such as private MSC 60, to provide telecommunications services. Base service logic module 81 formulates such call processing instructions by accessing the information contained in subscriber database 74 and by executing one or more of service logic modules 76–80.

Preferably, database 74, service logic modules 76–80, and base service logic module 81, are all resident on Gateway SCP 70. Alternatively, they may be provided in separate network elements. For example, base service logic module 81 may be located in a "control node" network element, and it may access the subscriber information in a separate database 74 and may execute service logic modules 76–80 located in one or more separate "application servers." Alternatively, database 74 or one or more of service logic modules 76–81 may be built into private MSC 60. Thus, private MSC 60 may be provided with a database functionality and/or service control functionality, in addition to a call connection, i.e., switching, functionality.

With reference to FIG. 1, Gateway SCP 70 is typically provided with one or more interfaces, such as Gateway SCP interface 82. Interface 82 may allow control over and provisioning of Gateway SCP 70. Interface 82 may include a service creation environment (SCE) to allow service logic to be created, tested, and downloaded to Gateway SCP 70. Interface 82 may also allow information to be retrieved from Gateway SCP 70, such as may be used to generate reports. Alternatively, instead of Gateway SCP 70 being provided with its own interface, WIN SCP Interface 40 may be used to access Gateway SCP 70.

In addition to providing wireless telecommunications services, private network 12 typically also provides wireline telecommunications services. For example, private network 12 may include a private branch exchange (PBX) 84, connected to a plurality of wireline stations, such as wireline station 86, and to private MSC 60, as shown in FIG. 1. Wireline station 86 may be a telephone, fax machine, modem, or other such device. In preferred embodiments, many subscribers of private network 12 may have both a wireline station and a mobile station.

PBX 84 switches calls between the wireline stations to which it is connected, private MSC 60, and PSTN 18. Typically, PBX 84 is not connected to PSTN 18 directly. Instead, PBX 84 is typically connected to a local SSP, such as SSP 88, via a primary rate interface ("PRI"), a multifrequency connection, or some other type of connection. SSP 88, in turn, is connected to PSTN 18 and to an STP 90 to send and receive SS7 signals on behalf of PBX 84. Typically, SSP 88 is also connected to a plurality of wireline stations, such as wireline station 92, that are not part of private network 12.

Alternatively, PBX 84 may be provided with SS7 signaling capability, in which case PBX 84 may be connected to PSTN 18 and to STP 90 directly (not shown in FIG. 1). Similarly, private MSC 60 may be connected to PSTN 18 directly, or it may route calls via PBX 84.

Through the use of Gateway SCP 70 and, optionally, PBX 84, private network 12 is typically able to provide enhanced telecommunications services to its mobile station and wireline station users. Such enhanced telecommunications services may include, without limitation, abbreviated dialing, call forwarding, and call screening. PBX 84 may be programmed with the service logic need to provide some of, or all of, the enhanced telecommunications services. In preferred embodiments, PBX 84 may also be provided with a voice mail system. Preferably, however, the service logic needed for the enhanced telecommunications services is provided by the service logic modules in Gateway SCP 70, as described above. In preferred embodiments, the service logic in Gateway SCP 70 may be invoked by either private MSC 60, to provide enhanced telecommunications services to mobile station users, or PBX 84, to provide enhanced telecommunications services to wireline station users.

In order for PBX 84 to communicate with Gateway SCP 70, PBX 84 may be provided with a computer telephony interface (CTI) 94. Preferably, CTI 94 signals to Gateway SCP 70 using a TCP/IP data link. Alternatively, CTI 94 could signal to Gateway SCP 70 using SS7, typically routed through one or more STPs, such as STP 72.

CTI 94 may operate as follows. When PBX 84 receives a call that is eligible for enhanced services, PBX 84 suspends the call and signals to CTI 94. CTI 94, in turn, launches a query to Gateway SCP 70. Gateway SCP 70 executes one or more of its service logic modules and then sends a response message to CTI 94 with the instructions and information needed to provide the services. Further details regarding the architecture and operation of CTI 94 are provided by copending U.S. application Ser. No. 09/322,780, filed on May 28, 1999 and titled "Integrated Wireless and Private Branch Exchange Communication Network," which is fully incorporated herein by reference.

Preferably, network 10 also includes a Local Number Portability Service Control Point (LNP SCP) 98. As described in more detail below, when an enterprise desires to implement private wireless network 12 to provide private wireless telecommunications services to its employees many of the employees may already have mobile stations that subscribe to public wireless network 14. In particular, the mobile stations may already have MDNs assigned to MSC 16. Instead of requiring new MDNs for these mobile stations, through the use of LNP SCP 98, the MDNs may simply be re-designated as corresponding to private MSC 60. Thus, a call made to the MDN is first routed to MSC 16, but MSC 16 then queries LNP SCP 98, typically via one or more STPs, such as STP 30 and 72, to determine where to redirect the call. LNP SCP 98 would then instruct MSC 16 to forward the call to private MSC 60.

Network 10 may also include other types of network elements to provide telecommunications services to users of private wireless network 12 and/or users of public wireless network 14. For example, network 10 may include a message center 96 to deliver short messages to mobile stations operating either in private network 12 or public network 14, as described in more detail below.

Using the configuration described above for private network 12, an enterprise can beneficially control the services it provides to both mobile station and wireline station users in network 12. For example, an enterprise may provide the same abbreviated dialing capabilities to mobile stations, such as mobile stations 64 and 66 as it makes available to its wireline stations, such as wireline station 86. The enterprise may also place added restrictions or provide additional services to its mobile station users. For example, the enterprise may wish to limit the airtime available to its mobile station users. Additionally, as described in more detail below, mobile station users may use their mobile stations within the coverage area of public network 14 as well as within the coverage area of private network 12. Moreover, with handoff capability, as is preferred, the mobile station users may move freely between the coverage areas of networks 12 and 14. However, the enterprise may specify that certain enhanced telecommunications services may only apply within private network 12 or that certain services may work differently when the mobile station user is within the coverage area of private network 12. As described in more detail below, the enterprise is also advantageously able to limit the usage of private network 12 to only the subscribers of private network 12.

Figure 4:
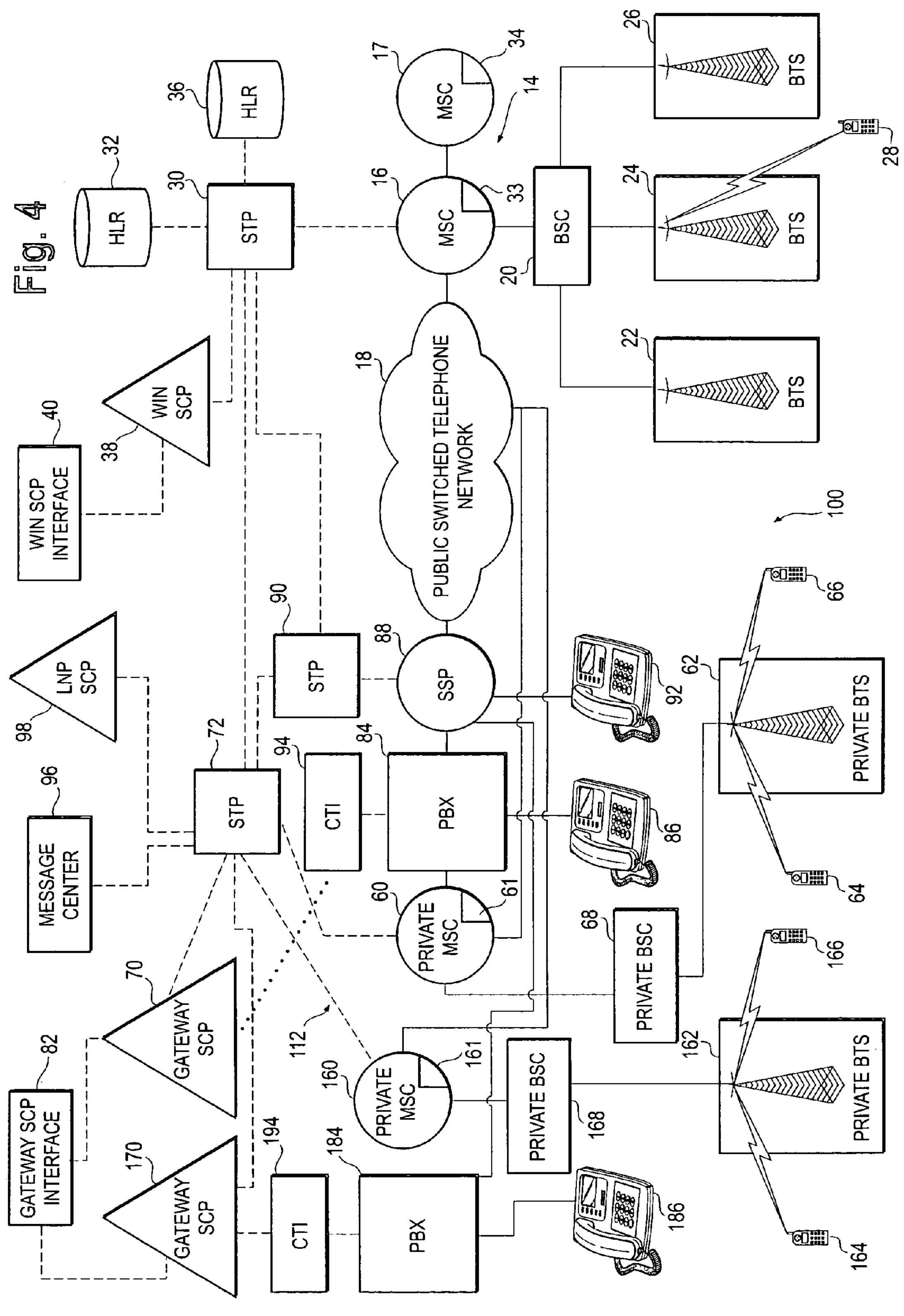
FIG. 4 is a block diagram of a private wireless network integrated with a public wireless network, in accordance with an exemplary embodiment of the present invention.

The private wireless networks of the present invention may also include more than one private MSC. For example, FIG. 4 shows an exemplary network 100, which is similar to exemplary network 10, except as described herein. Network 100 includes a private wireless network 112 that includes the elements described above for private wireless network 12, such as private MSC 60 and Gateway SCP 70, and also includes a second private MSC 160. Private MSC 160, which has a VLR 161, controls a private BTS 162, optionally via a private BSC 168. Private BTS 162 provides a wireless coverage area within which mobile stations, such as mobile stations 164 and 166 may communicate with private BTS 162 over an air interface. The wireless coverage areas provided by private BTSs 62 and 162 may be either overlapping or non-overlapping. Network 112 preferably also includes a second Gateway SCP 170, which is accessible to private MSC 160, such as via STP 72. Network 112 may also include a second PBX 184, to which is connected a second set of wireline stations, such as wireline station 186. PBX 184 may communicate with Gateway SCP 170 via a CTI 194.

A configuration such as private wireless network 112 may be used by an enterprise that has two or more separate locations. For example, an enterprise may already use PBX 84 in a building located in one city and PBX 184 in another building located in another city. Thus, to provide wireless service, the enterprise may simply add private MSC 60, Gateway SCP 70, and associated network elements, to its existing PBX 84 and also add private MSC 160, Gateway SCP 170, and associated network elements, to its existing PBX 184. If the enterprise operates in still other locations, it may install still other private MSCs, private BTSs, and Gateway SCPs to serve these other locations. The enterprise may provide separate interfaces for its Gateway SCPs. However, to coordinate the process of provisioning and monitoring the different parts of its private wireless network 112, an enterprise may use a single Gateway SCP Interface 82, as shown in FIG. 4, for its multiple Gateway SCPs, such as Gateway SCP 70 and Gateway SCP 170.

Figure 5:
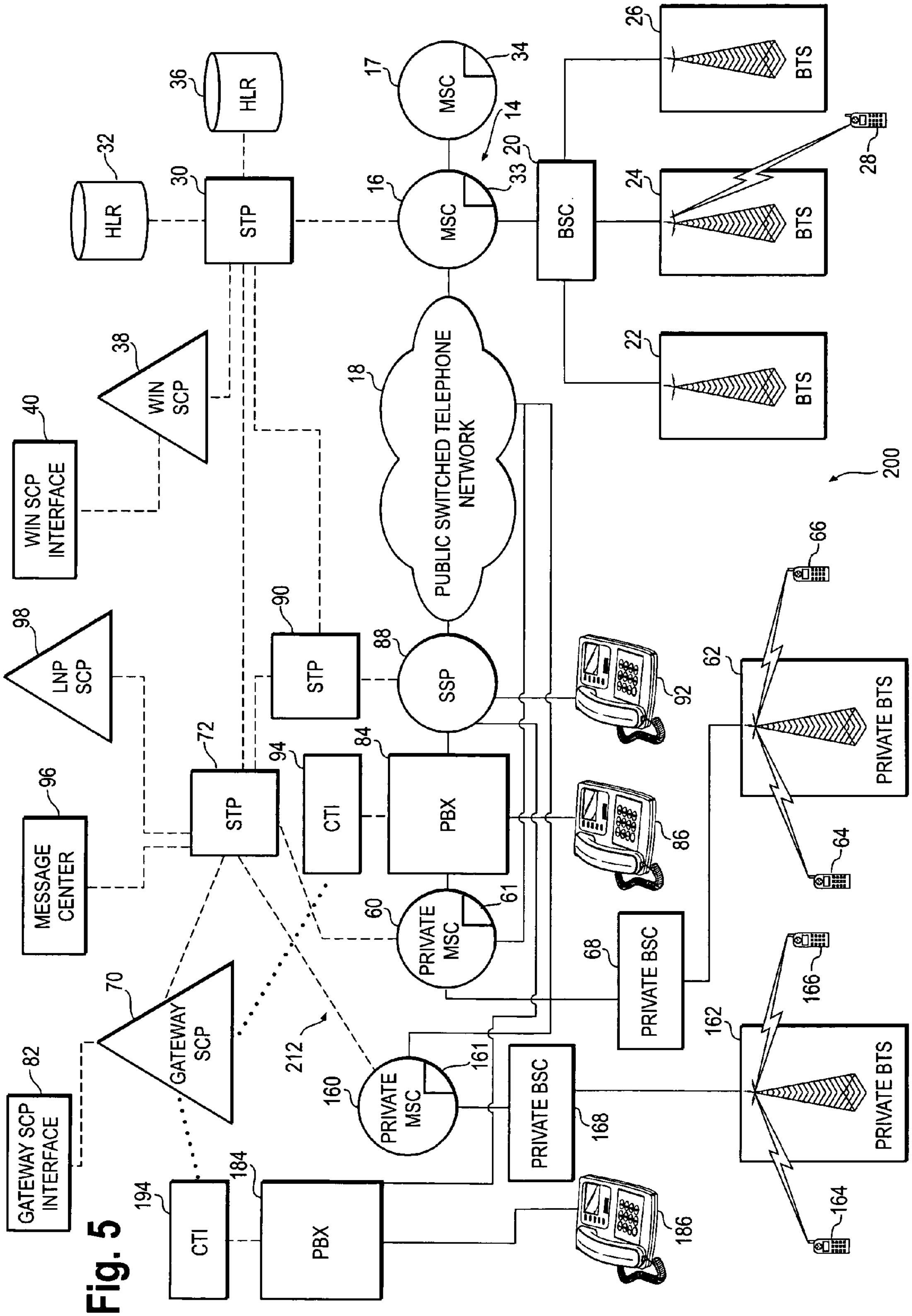
FIG. 5 is a block diagram of a private wireless network integrated with a public wireless network, in accordance with an exemplary embodiment of the present invention.

Alternatively, an enterprise may use a single Gateway SCP to control multiple private MSCs and PBXs. For example, FIG. 5 shows an exemplary network 200, which is similar to network 100 in most respects, except as described herein. Network 200 includes a private wireless network 212 that includes private MSCs 60 and 160, private BSCs 68 and 168, private BTSs 62 and 162, PBXs 84 and 184, and CTIs 94 and 194. Private network 212 may also include additional, private MSCs, private BSCs, private BTSs, PBXs, and CTIs. In private network 212, Gateway SCP 70 is accessed by both private MSC 60 and private MSC 160, via STP 72. Similarly, Gateway SCP 70 is connected to both CTIs 94 and 194.

Figure 6:
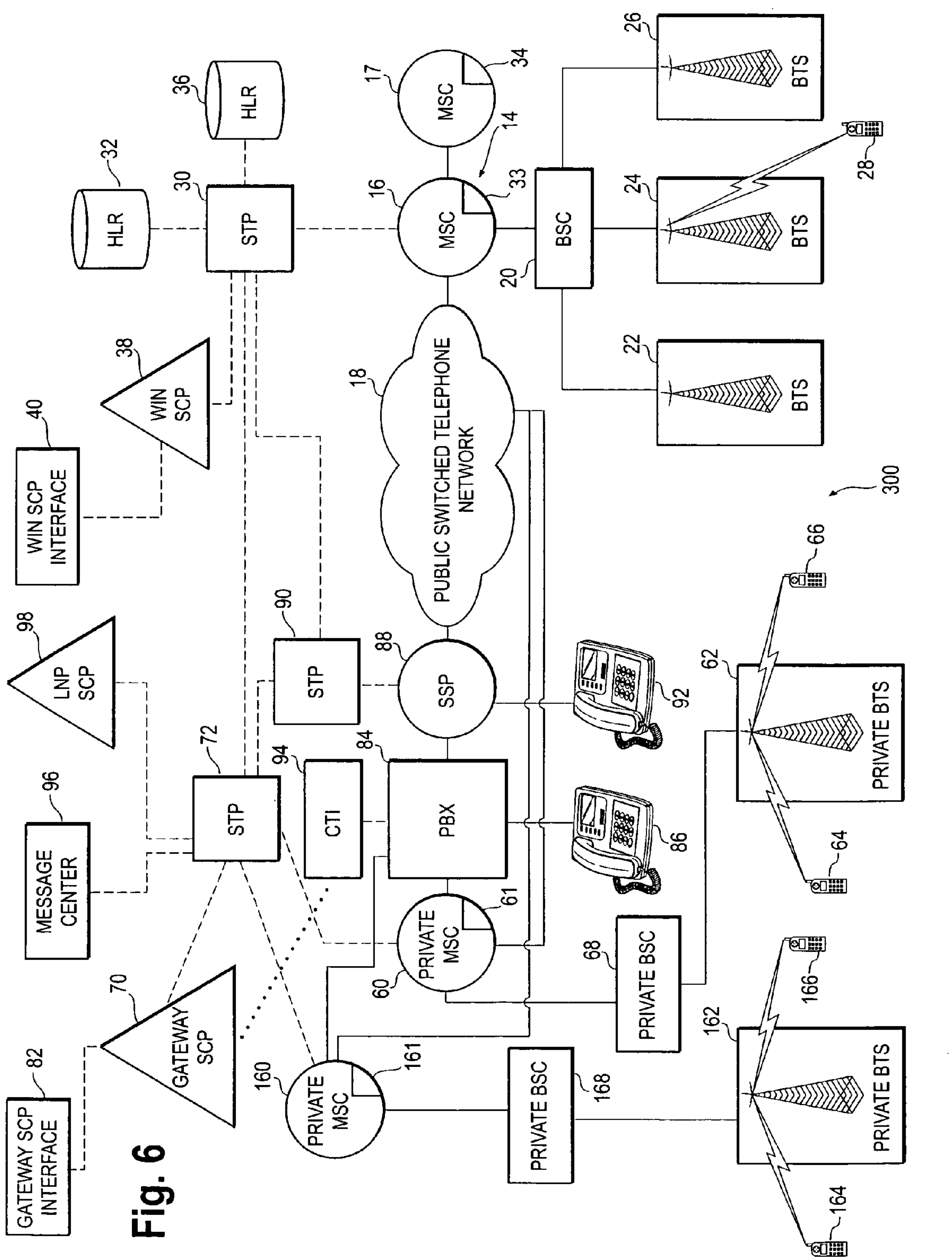
FIG. 6 is a block diagram of a private wireless network integrated with a public wireless network, in accordance with an exemplary embodiment of the present invention.

In other embodiments, an enterprise may use more than one private MSC with a given PBX. For example, FIG. 6 shows an exemplary network 300, which is similar to exemplary network 200, except as described herein. Network 300 includes a private wireless network 312 in which private MSCs 60 and 160 are both connected to PBX 84. Moreover, PBX 84 may be connected to more than two private MSCs. This configuration may be used by an enterprise that wants to provide a wireless coverage area, such as for a large campus, that is larger than can be provided by a single private MSC.

Registration and De-Registration

Typically, a mobile station must register with a wireless network before it is able to place or receive calls. Thus, with reference to FIG. 1, mobile stations 64 and 66 must register with private wireless network 12 before they are able to use the resources of network 12. Similarly, mobile station 28 must register with public wireless network 14 before it is able to use the resources of network 14. Typically, a mobile station will attempt to register with a network when it powers up in the wireless coverage area of that network. A mobile station may also become registered with a network as a result of a handoff to that network. Mobile stations may also be programmed to attempt to re-register with the network periodically, such as every 10 minutes.

Figure 7:
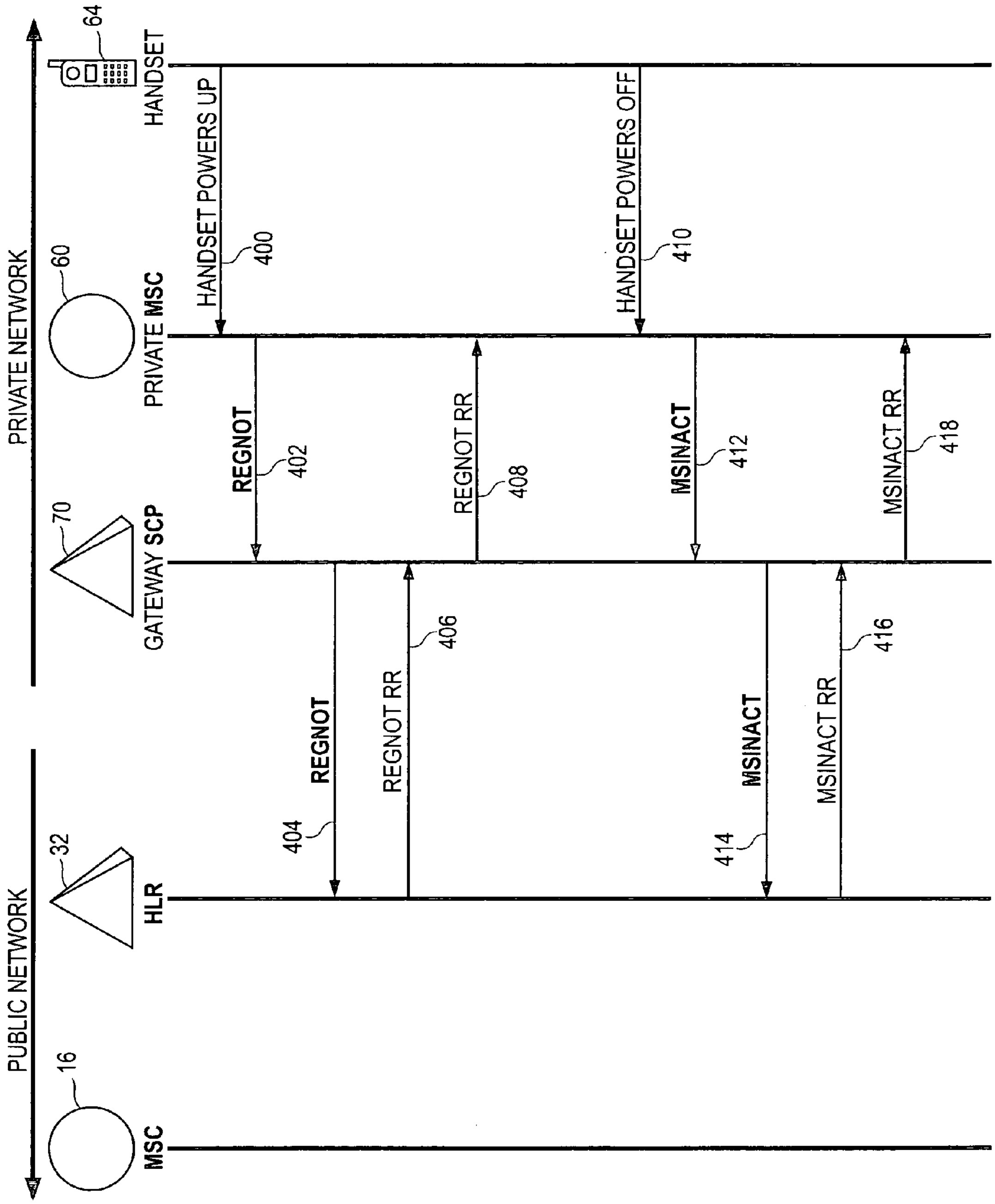
FIG. 7 is a simplified call flow diagram illustrating the process of a mobile station registering and de-registering with a private wireless network, in accordance with an exemplary embodiment of the present invention.

FIG. 7 is a simplified call flow diagram showing the signaling that takes place when a mobile station, such as mobile station 64 attempts to register with private network 12, such as when mobile station 64 first powers up within the wireless coverage area of network 12. The call flows described herein with respect to FIG. 7 and subsequent figures are described based on the use of IS-41 and IS-771. However, it is to be understood that other signaling systems or protocols could also be used. The registration attempt begins when mobile station 64 transmits a registration request signal 400, such as would typically occur when mobile station 64 first powers up. Registration request 400 signifies that mobile station 64 is attempting to register with private network 12 and typically includes as registration request information the 10-digit mobile identification number (MIN) of mobile station 64 and the 32-bit electronic serial number (ESN) of mobile station 64. Private BTS 62 receives registration request message 400 and transmits the registration request information to private MSC 60, via private BSC 68.

Private MSC 60 then transmits to Gateway SCP 70 a registration notification ("REGNOT") message 402, preferably in accordance with the IS-41 specification. REGNOT message 402 will typically identify mobile station 64 by its MIN and ESN. Gateway SCP 70 then uses this identifying information to try to locate subscriber information for mobile station 64 in subscriber database 74. If mobile station 64 does not subscribe to private network 12, then database 74 will not contain the information needed to validate it. In that case, Gateway SCP 70 may be programmed to deny service to mobile station 64. Gateway SCP 70 would then transmit to private MSC 60 an IS-41 registration notification return result "regnot_rr" message, instructing private MSC 60 to deny service to mobile station 64.

In this way, private wireless network 12 is able to control which mobile stations can access network 12. In particular, only mobile stations having specified MINs would normally be able to access network 12. This beneficially prevents other mobile stations that may be in the wireless coverage area of network 12 from taking up the resources of network 12.

However, other approaches for controlling access to private wireless network 12 may be used. For example, a CDMA mobile station may be programmed with a preferred roaming list ("PRL") that specifies that the mobile station can operate on only certain specified wireless networks or that certain wireless networks are preferred. In particular, each cellular service provider is assigned a 15-bit system identification number ("SID"), and certain portions of a cellular service provider's network may be further specified by a network identification number ("NID"). Each BTSs broadcasts its SID and NID to identify the cellular service provider to which it belongs. The PRL includes a list of SIDs and NIDs and specifies whether these networks must be used exclusively or are only preferred. The PRL can be sent to the mobile station by means of Over-The-Air-Service-Provisioning ("OTASP"). PRLs and OTASP are described in more detail in TIA/EIA/IS-683-A, which is incorporated herein by reference. Thus, another way of controlling access to private wireless network 12 is to program the SID and NID of network 12 into the PRLs of only the mobile stations that subscribe to network 12.

If Gateway SCP 70 is able find subscriber information for mobile station 64 in database 74, then it updates the data record for mobile station 64 to indicate that mobile station 64 is now active. Gateway SCP 70 also sets the locator address for mobile station 64 as an address for private MSC 60.

As describe above, mobile stations, such as mobile station 64, that use private network 12 also preferably subscribe to public wireless network 14. Thus, mobile station 64 preferably has a data record stored in HLR 32, in addition to its data record stored in Gateway SCP 70. Accordingly, during the registration process, Gateway SCP 70 also transmits an IS-41 REGNOT message 406 to HLR 32. REGNOT message 404 typically identifies mobile station 64 by its MIN and ESN. IS-41 REGNOT messages may also include a number of other parameters to control communication with a mobile station once it is registered. For example, an IS-41 REGNOT message normally includes an "MSCID" parameter that identifies the MSC reporting the mobile station's registration attempt and an "SMSaddr" parameter that specifies where SMS messages should be sent. In this case, REGNOT message 404 identifies Gateway SCP 70 in the MSCID parameter and may also identify private MSC 60 in the SMSaddr parameter.

Note that even if mobile station 64 is not a subscriber of private network 12, Gateway SCP 70 may optionally grant mobile station 64 access to private network 12 and transmit a REGNOT message to the HLR of mobile station 64.

When HLR 32 receives REGNOT message 404, it finds the data record for mobile station 64 based on its MIN. Next, HLR 30 transmits to Gateway SCP 70 an IS-41 registration notification return result ("regnot_rr") message 406. Message 406 normally includes the service profile information for mobile station 64, i.e., the services that mobile station 64 subscribes to on public wireless network 14. Gateway SCP 70 then uses the service profile information for mobile station 64 in subscriber database 74 to either modify or completely override the service profile information obtained from HLR 32, so as to create a working service profile for mobile station 64. This working service profile defines the services available to mobile station 64 while it is in the coverage area of private network 12. Thus, the enterprise has the option of allowing some of, all of, or none of, the services available to mobile station 64 when it is operating in public network 14 to carry over when mobile station 64 is operating in private network 12.

Gateway SCP 70 can also reconcile potentially incompatible aspects of the two service profiles for mobile station 64. For example, the user of mobile station 64 may have subscribed to an abbreviated dialing service in public network 14 and designated the digits "1234" to indicate a friend's telephone number. If the digits "1234" also represents an extension in private network 12, then Gateway SCP 70 could create a working service profile for mobile station 64, wherein "1234" represents the extension, rather than the friend's telephone number. However, if the digits "1234" did not conflict with any digit string used in private network 12, Gateway SCP 70 could maintain "1234" as an abbreviation for the friend's telephone number in the working service profile for mobile station 64.

Gateway SCP 70 then transmits to private MSC 60 an IS-41 regnot_rr message 408 to confirm that mobile station 64 is to be granted access to private network 12. Preferably, message 408 also includes the working service profile that Gateway SCP 70 created for mobile station 64. Private MSC 60 stores this working service profile in its VLR 61. At this point, mobile station 64 is registered with both Gateway SCP 70 and with HLR 32. Mobile station 64 is, thus, able to originate and to receive calls in the coverage area of private network 12, in accordance with the its working service profile stored in the VLR 61 of private MSC 60.

Although mobile station 64 is registered with both Gateway SCP 70 and HLR 32, its registrations with these two network elements is very different. In particular, on Gateway SCP 70 the locator address for mobile station 64 would be private MSC 60, whereas on HLR 32 the locator address would be the address of Gateway SCP 70.

FIG. 7 also shows a simplified call flow for the process of de-registering mobile station 64, such as would occur when mobile station 64 powers off within the wireless coverage of private wireless network 12. Mobile station 64 sends a de-registration signal 410, which is received by private BTS 62 and forwarded to private MSC 60. Signal 410 normally includes the MIN and ESN of mobile station 64. Private MSC 60 then sends an IS-41 mobile station inactive ("MSINACT") message 412 to Gateway SCP 70 to indicate that mobile station 64 is inactive and not able to receive calls. Gateway SCP 70 sends an MSINACT message 414 to HLR 32 so that HLR 32 is also notified that mobile station 64 is inactive. Messages 412 and 414 normally include the MSN and ESN of mobile station 64. HLR 32 confirms receipt of the message by sending Gateway SCP 70 an IS-41 msinact_rr message 416. Gateway SCP 70 also sends private MSC 60 a msinact_rr message 418. Private MSC 60 then deletes the entry for mobile station 64 from its VLR 61.

In contrast, the process for registering a subscriber mobile station, such as mobile station 64, when it is in the coverage area of public wireless network 14, i.e., its home network, or some other public wireless network, would typically not involve Gateway SCP 70 at all. This is because when a subscriber mobile station attempts to register in any network, it identifies itself by its MIN, and the MSC serving it typically determines which HLR to send a REGNOT message based on this MIN. In preferred embodiments of the present invention, the subscriber mobile stations have MINs that correspond to HLR 32. Thus, when a subscriber mobile station attempts to register outside of private network 12, the MSC receiving the registration request sends a REGNOT message to HLR 32, as the HLR corresponding to the subscriber's mobile station MIN, and HLR 32 would not normally forward it to Gateway SCP 70. Moreover, other services, such as short message delivery, that identify mobile stations by MIN would also typically query HLR 32 to reach the subscriber mobile stations.

The registration process is different in private network 12 because the private MSCs are programmed to route most queries to Gateway SCP 70 instead of routing queries based on MIN. The result of the different registration processes used in private network 12 and public network 14 may be summarized as follows. When a subscriber mobile station is registered with private network 12, Gateway SCP 70 has a locator address for it that identifies which private MSC is serving the subscriber mobile station. However, the subscriber mobile station's locator address in HLR 32 would typically identify only Gateway SCP 70.

When a subscriber mobile station is registered with public network 14, HLR 32 has a locator address for it that identifies which MSC is serving it. However, Gateway SCP 70 would typically not have a valid locator address for the subscriber mobile station because Gateway SCP 70 is not typically notified when a subscriber mobile station registers with public network 14. Nevertheless, Gateway SCP 70 is able to find the subscriber mobile stations when they are operating in the coverage area of public network 14 by querying HLR 32.

Originating and Receiving Calls

Figure 8:
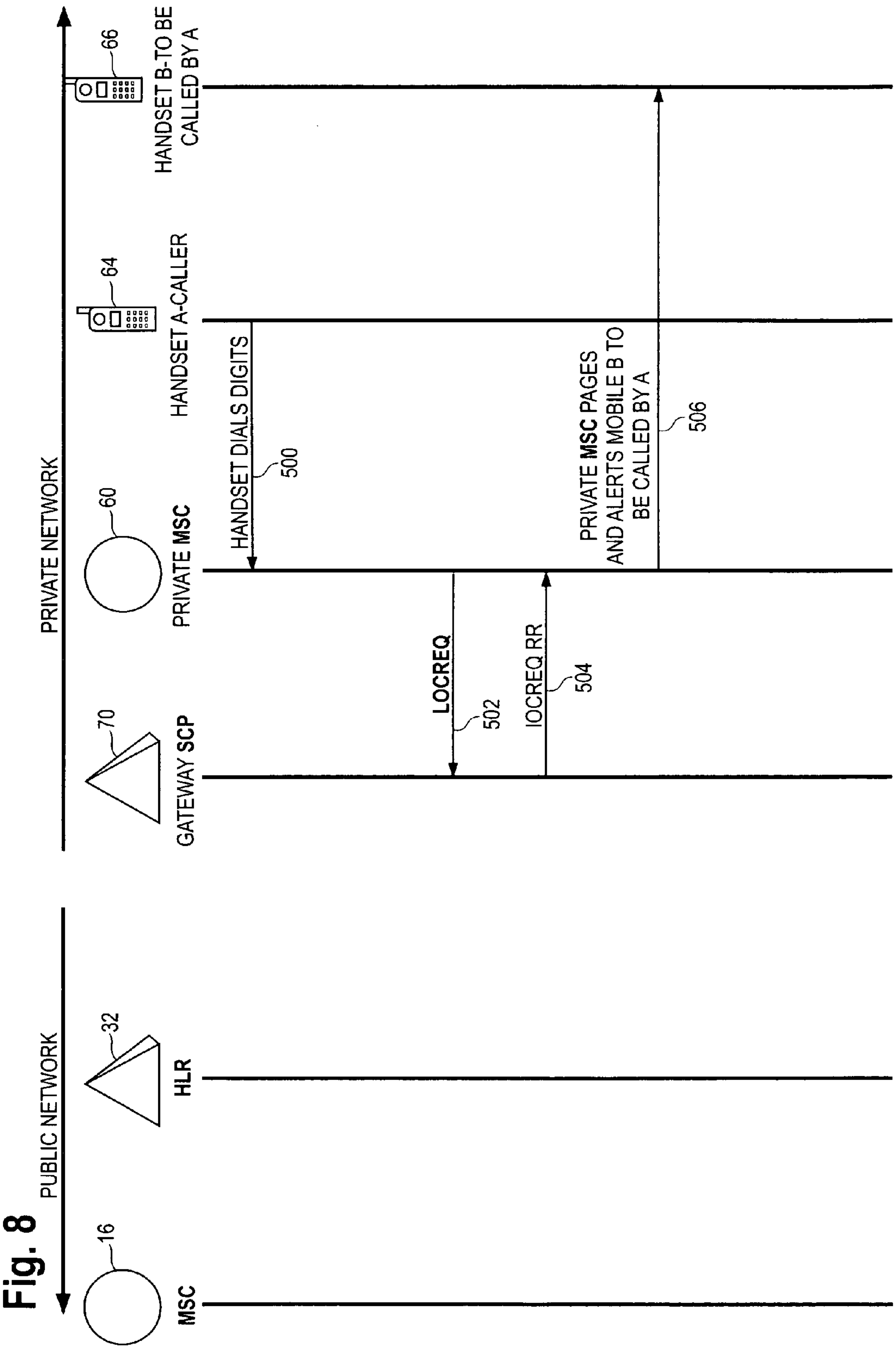
FIG. 8 is a simplified call flow diagram illustrating the process of a first mobile station operating in the private wireless network originating a call to a second mobile station operating in the private wireless network, in accordance with an exemplary embodiment of the present invention.

Once a mobile station is registered, either with private network 12 or with public network 14, it is able to make and to receive calls. FIG. 8 is a simplified call flow diagram illustrating an exemplary call setup process for the case of mobile station 64, already registered with private network 12, placing a call to mobile station 66, also registered with private network 14. The caller dials the number of mobile station 66, and mobile station 64 transmits a signal 500 containing the dialed digits. Private BTS 62 receives the dialed digits and forwards them to private MSC 60. In response, private MSC 60 sends to Gateway SCP 70 an IS-41 Location Request ("LOCREQ") query 502 containing the dialed digits. From the dialed digits, Gateway SCP 70 identifies mobile station 66 as the station being called and retrieves the data record for mobile station 66 from database 74. In this case, the locator address for mobile station 66 would indicate that is in the coverage area of private network 12. If the status information for mobile station also indicates that it is available to receive a call, then Gateway SCP 70 then sends to private MSC 60 an IS-41 Location Request Return Result ("locreq_rr") message 504 that instructs private MSC 60 to attempt to terminate the call to mobile station 66. In response, private MSC 60 sends, via private BSC 68 and private BTS 62, a signal set 506 to page and alert mobile station 66. When mobile station 66 answers, a voice path is established between mobile stations 64 and 66. Thus, advantageously, in the simplest case of mobile stations calling each other within the coverage area of private network 12, HLR 32 does not need to be queried and the resources of public network 14 do not need to be used.

Figure 9:
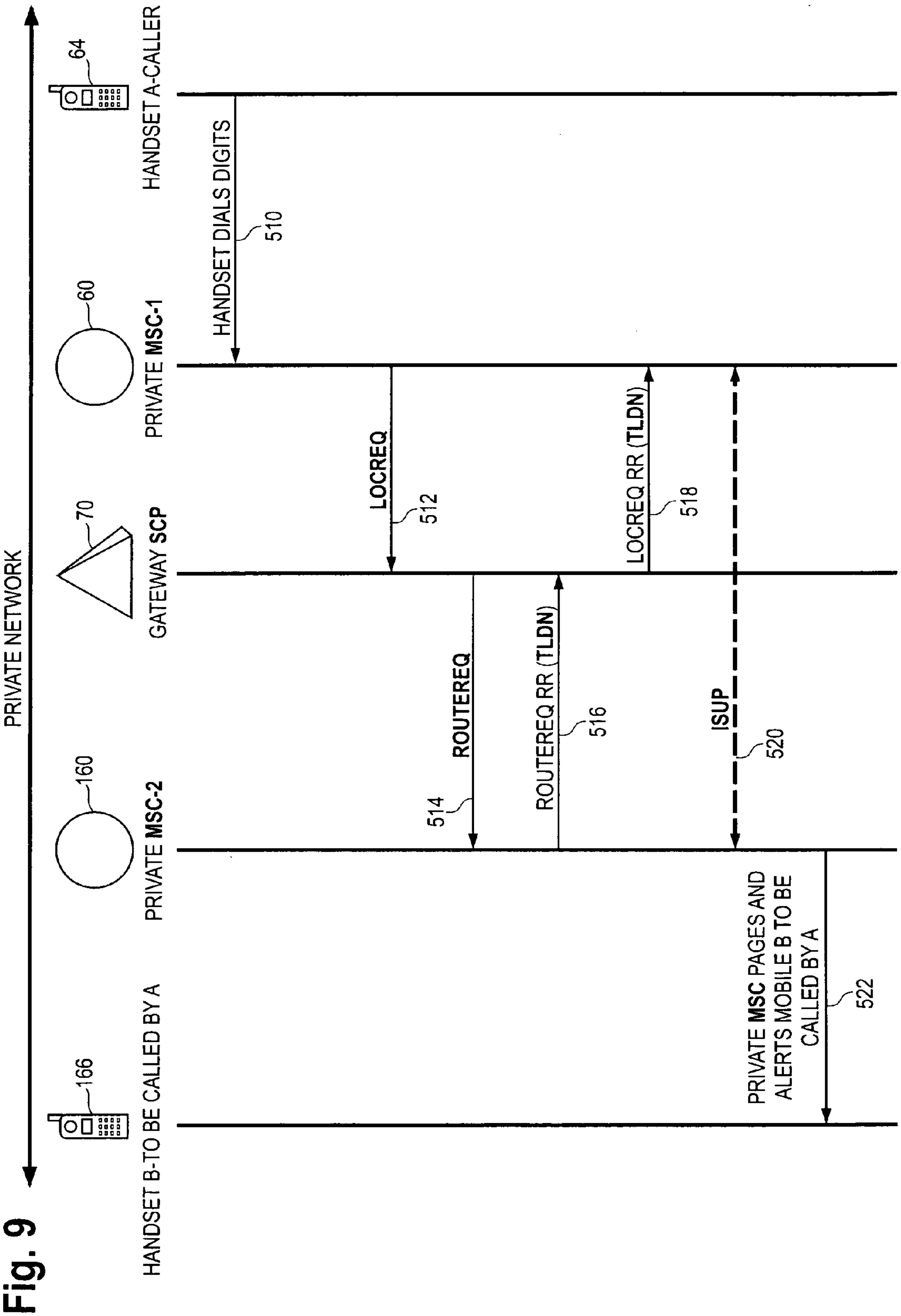
FIG. 9 is a simplified call flow diagram illustrating the process of a first mobile station that is served by a first private MSC in the private wireless network originating a call to a second mobile station that is served by a second private MSC in the private wireless network, in accordance with an exemplary embodiment of the present invention.

FIG. 9 illustrates an exemplary call flow for the case of a private network using two or more private MSCs and where the caller and called mobile stations are being served by two different private MSCs. This may occur, for example, in a configuration like that of private network 112 shown in FIG. 3. In this example, the caller is using mobile station 64, which is in the coverage area being served by private MSC 60, to call mobile station 166, which is in the coverage area of private MSC 160. The caller dials the number for mobile station 166, and mobile station 64 transmits a signal 520 containing the dialed digits. Private MSC 60 receives the dialed digits and sends a LOCREQ message 512 to Gateway SCP 70. Gateway SCP 70 determines from the dialed digits that mobile station 166 is being called and determines from the locator address for mobile station 166 that it is being served by private MSC 160. Gateway SCP 70 then sends an IS-41 Routing Request ("ROUTREQ") signal 514 to private MSC 160 to set up the call. In response, private MSC 160 allocates a Temporary Location Directory Number ("TLDN") and sends the TLDN to Gateway SCP 70 in an IS-41 Routing Request Return Result ("routreq_rr") message 516. Gateway SCP 70 then forwards the TLDN in an IS-41 Location Request Return Result ("locreq_rr") message 518 to private MSC 60. Private MSC 60 then routes the call to this TLDN, which corresponds to private MSC 160. To accomplish this call routing, private MSC 60 may, for example, exchange SS7 Integrated Services User Part ("ISUP") messages 520 with private MSC 160. Once the call is routed to private MSC 160, it sends a signals set 522 to page and alert mobile station 166. When mobile station 166 answers, the voice path from mobile station 64 to mobile station 166 is completed.

In the example shown in FIG. 9, once again only the resources of private network 12 need to be used to complete the call. Moreover, in this example, it is Gateway SCP 70 that determines how to find mobile station 166, i.e., via its locator address, whereas in public network 14, it is HLR 32 that normally plays this role.

Figure 10:
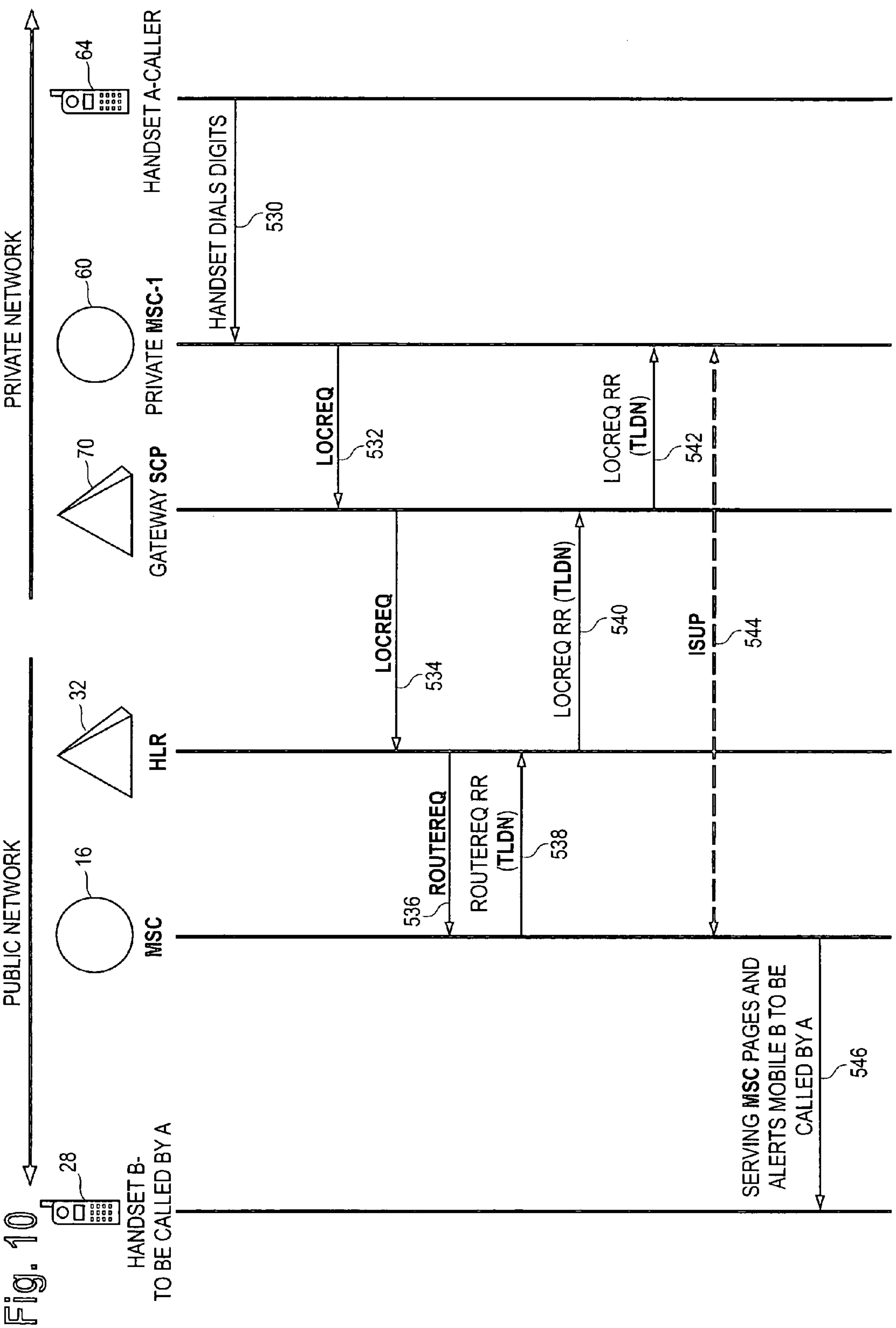
FIG. 10 is a simplified call flow diagram illustrating the process of a first mobile station operating in the private wireless network originating a call to a second mobile station operating in the public wireless network, in accordance with an exemplary embodiment of the present invention.

If Gateway SCP 70 does not have the information needed to locate the mobile station being called, then it may forward the request to a network entity, such as HLR 32 that may have the information. This is illustrated in the simplified call flow shown in FIG. 10 for the case of mobile station 64, operating in the coverage area of private network 12, calling a mobile station, such as mobile station 28, that subscribes to private network 12 but is within the coverage area of public network 14. The caller dials the number for mobile station 28, and mobile station 64 transmits a signal 530 containing the dialed digits. Private MSC 60 receives the dialed digits and transmits a LOCREQ message 532 to Gateway SCP 70 containing the dialed digits. Gateway SCP 70 identifies mobile station 28 from the dialed digits and obtains its data record. From this data record, Gateway SCP 70 determines that mobile station 28 is not currently registered with private network 12, so that no current locator address for this mobile station is available. As a result, Gateway SCP 70 sends a LOCREQ message 534 to HLR 32 to locate mobile station 28. LOCREQ message 534 typically includes the MIN and/or MDN for mobile station 28, or some other identification of mobile station 28. From this identifying information contained in LOCREQ message 534, HLR 32 obtains the data record for mobile station 28. From this data record, HLR 32 obtains a locator address for mobile station 28. In this example, the locator address would indicate that mobile station 28 is being served by MSC 16. Accordingly, HLR 32 sends a ROUTREQ message 536 to MSC 16 to set up the call. In response, MSC 16 allocates a TLDN and transmits a routereq_rr message 538 containing this TLDN to HLR 32. HLR 32 then sends a locreq_rr message 540 containing the TLDN to Gateway SCP 70. Gateway SCP 70, in turn, forwards the TLDN in a locreq_rr message 542 to private MSC 60. Private MSC 60 then performs the signaling, such as by exchanging ISUP messages 544 to MSC 16, to route the call to the TLDN. Once the call is routed to MSC 16, it sends, via BSC 20 and BTS 24, a signal set 546 to page and alert mobile station 28. When mobile station 28 answers, the voice path between mobile station 64 and mobile station 28 is completed.

Call Termination

The procedures used to set up calls from outside of private network 12 to mobile stations subscribing to private network 12 will, in general, depend on how mobile directory numbers are assigned to the subscribing mobile stations. In particular, at least four different approaches are available for providing subscribing mobile stations, such as mobile station 64 with a mobile directory number: (1) mobile station 64 may have only a directory number that corresponds to private network 12; (2) mobile station 64 may have only a directory number that corresponds to public network 14; (3) mobile station 64 may have a first directory number that corresponds to private network 12 and a second directory number that corresponds to public network 14; and (4) mobile station 64 may have a directory number corresponding to public network 14 that has been ported to private network 12 through the use of Local Number Portability.

Although any of these four methods may be used, the fourth method is preferred. Thus, in preferred embodiments, the mobile stations subscribing to private network 12 will have mobile directory numbers that were originally allocated to a "home" MSC, such as MSC 17, in public network 14. To port these numbers to the private network 12, LNP SCP 98 is provisioned with information to indicate that calls to certain directory numbers should be redirected to private MSC 60 and the "home" MSCs are updated to query LNP SCP 98 when calls to these certain directory numbers are made.

Figure 11:
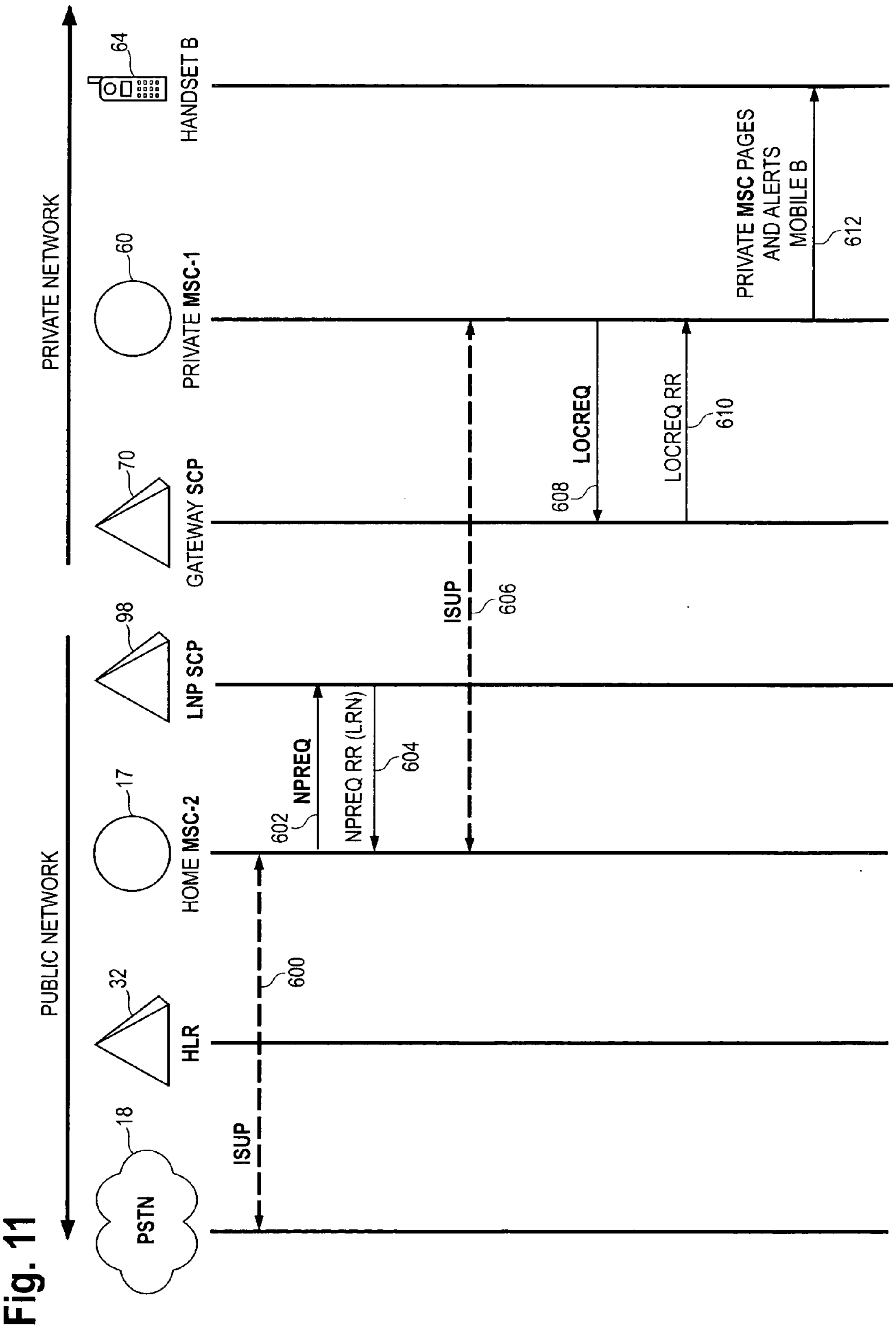
FIG. 11 is a simplified call flow diagram illustrating the process of terminating a call routed through the PSTN to a mobile station operating in the private wireless network, in accordance with an exemplary embodiment of the present invention.

FIG. 11 illustrates an exemplary call flow when a call, routed through PSTN 18, is made to mobile station 64 operating in the coverage area of private network 12. The call may be from a caller using a wireline station, such as station 92, a mobile station, or other device outside of private network 12. In this example, the directory number for mobile station 64 was originally allocated to MSC 17. Thus, the call is originally routed through PSTN 18 to MSC 17, such as by exchanging ISUP messages 600. In response, MSC 17 sends a Number Portability Request ("NPREQ") message 602 to LNP SCP 98. LNP SCP 98 sends back a Number Portability Request Return Result ("npreq_rr") message 604 containing a Local Routing Number ("LRN"), corresponding to private MSC 60. MSC 17 then routes the call accordingly, such as by exchanging ISUP messages 606 with private MSC 60. When the call is routed to private MSC 60, it sends a LOCREQ message 608 to Gateway SCP 70. Gateway SCP 70 responds with a locreq_rr message 610. Private MSC 60 then sends a signal set 612 to page and alert to mobile station 64.

Figure 12:
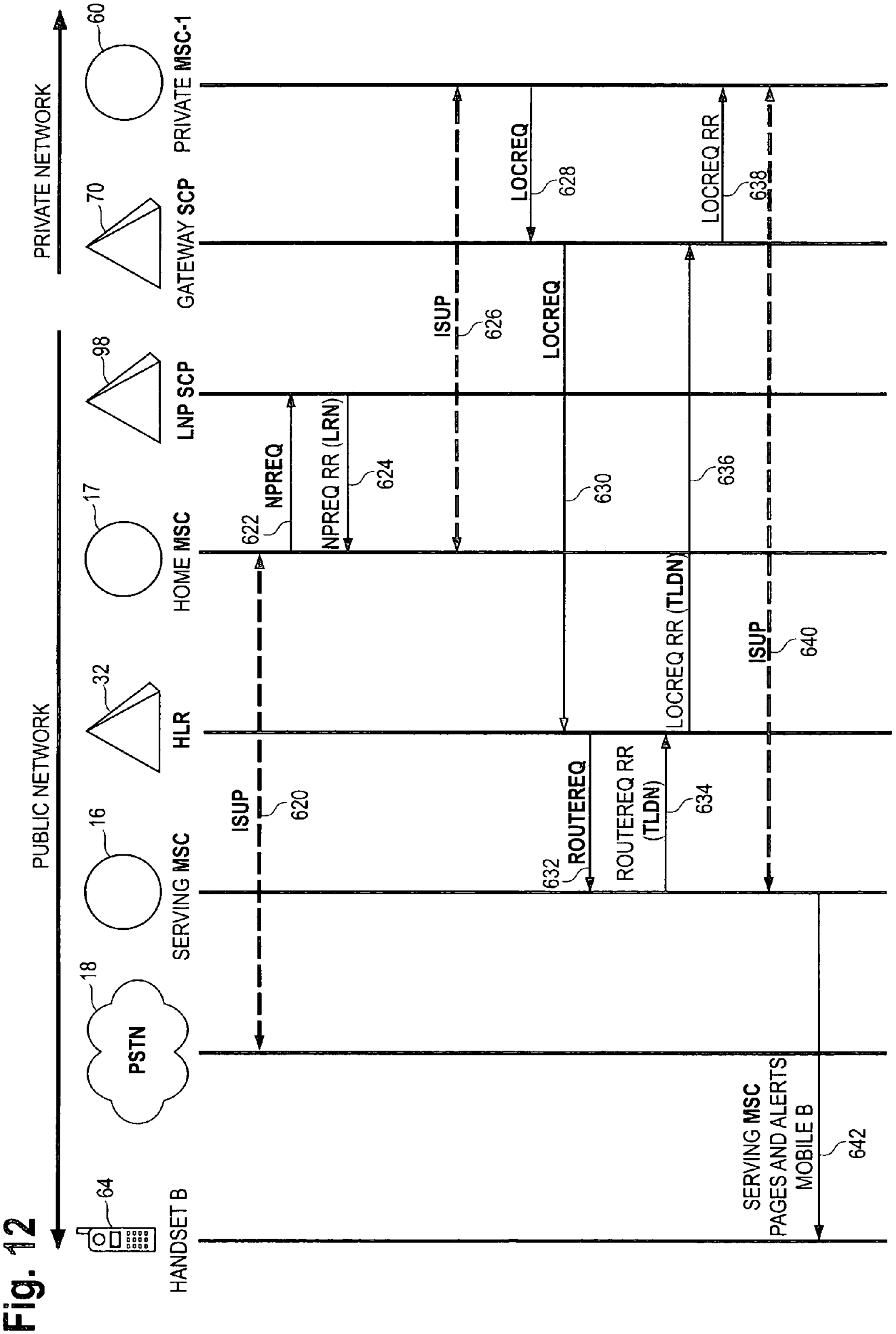
FIG. 12 is a simplified call flow diagram illustrating the process of terminating a call routed through the PSTN to a mobile station operating in the public wireless network, in accordance with an exemplary embodiment of the present invention.

FIG. 12 illustrates, in simplified form, the process for terminating a call, routed through PSTN 18, to mobile station 64 when it is operating in the coverage area of public network 14 and being served by MSC 16. The process begins in a matter similar to the case when mobile station 64 is in the coverage area of private network 12. The call is routed through PSTN 18 to "home" MSC 17, typically by an exchange of ISUP messages 620. "Home" MSC 17 transmits a NPREQ message 622 to LNP SCP 98, and LNP SCP 98 responds with a nqreq_rr message 624 that includes a LRN. "Home" MSC 17 uses the LRN to signal to private MSC 60, such as by exchanging ISUP messages 626. Private MSC 60 then sends a LOCREQ message 628 to Gateway SCP 70. In this case, mobile station 64 is not registered with private network 12, so Gateway SCP 70 sends a LOCREQ message 630 to HLR 32 to locate mobile station 64. HLR 32 identifies mobile station 64 from the information contained in LOCREQ message 630. From the locator address for mobile station 64, HLR 32 determines that MSC 16 is currently the serving MSC. Thus, HLR 32 sends a ROUTEREQ message 632 to MSC 16. MSC 16 allocates a TLDN and includes it in a routereq_rr message 634 to HLR 32. In response, HLR 32 sends a locreq_rr message 636 to Gateway SCP 70 containing the TLDN. Gateway SCP 70, in turn, sends a locreq_rr message 638 with the TLDN to private MSC 60. Private MSC 60 then performs the signaling needed to route the call to this TLDN, such as by exchanging ISUP messages 640 with MSC 16. MSC 16 then sends a signal set 642 to page and alert mobile station 64.

Call Origination Services

The present invention also allows enhanced call origination services to apply to subscribing mobile stations, whether they are operating in the private network or in public network. Moreover, the enhanced call origination services may be different, depending on whether the mobile station is in the private network or the public network. Abbreviated dialing is an example of such a call origination service. In an abbreviated dialing service, a caller is able to dial only an abbreviated digit strings, such as a four-digit string, to place a call. The four-digit string may, for example, correspond to an office extension used by the enterprise. The present invention beneficially enables subscribing mobile stations to dial such abbreviated digit strings and be able to reach other subscribing mobile stations, regardless of whether the caller or called mobile stations are operating in the private network or the public network.

Figure 13:
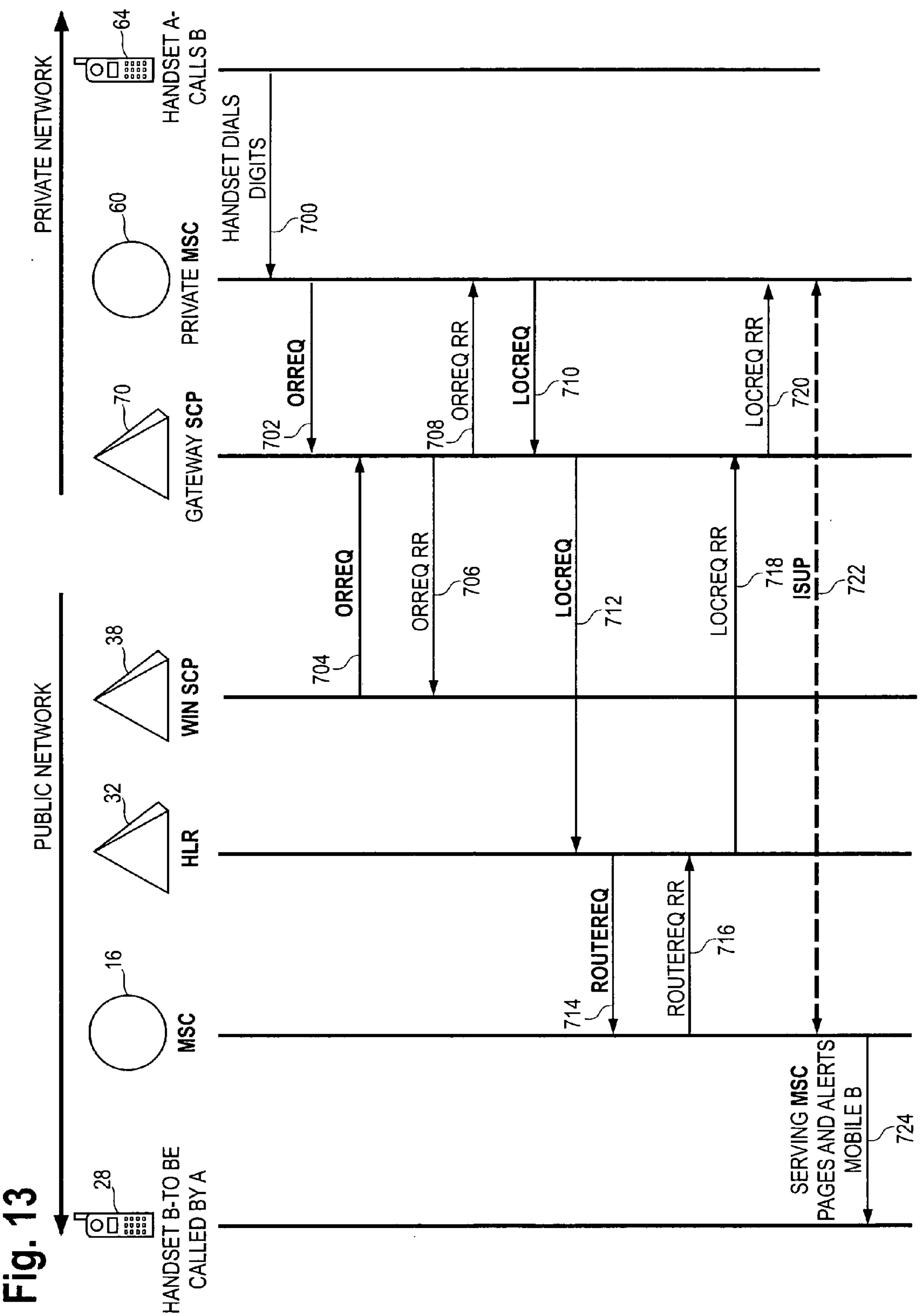
FIG. 13 is a simplified call flow diagram illustrating the process of applying call origination services to a mobile station operating in the private wireless network, in accordance with an exemplary embodiment of the present invention.

FIG. 13 illustrates an exemplary call flow for the case of mobile station 64, operating in the coverage area of private network 12, using an abbreviated digit string to call mobile station 28, a mobile station that subscribes to private network 12 but that is operating in the coverage area of public network 14. The caller dials an abbreviated digit string that corresponds to mobile station 28, and mobile station 64 transmits a signal 700 containing the dialed digits. Private MSC 60 receives the abbreviated digit string and recognizes a call origination trigger from the service profile for mobile station 64, the service profile having been downloaded into its VLR 61 when mobile station 64 registered. As a result of this call origination trigger, private MSC 60 sends an IS-41 Origination Request ("ORREQ") message 702, containing the abbreviated digit string, to Gateway SCP 70.

What Gateway SCP 70 does next will depend on where the service logic needed to process the abbreviated digit string is located. In one preferred embodiment, the required service logic resides in WIN SCP 38, in which case Gateway SCP 70 forwards the abbreviated digit string to WIN SCP 38 in an ORREQ message 704, as shown in FIG. 13. WIN SCP 38 then executes its service logic to obtain the full directory number of mobile station 28. WIN SCP 38 then sends an IS-41 Origination Request Return Result ("orreq_rr") message 706 containing the complete directory number to Gateway SCP 70. Gateway SCP 70 forwards the complete directory number in an orreq_rr message 708 to private MSC 60. In another preferred embodiment, Gateway SCP 70 may have the service logic needed to process the abbreviated digit string. In that case, in response to ORREQ message 702 Gateway SCP 70 would execute its own service logic and would transmit the complete directory number to private MSC 60 in an orreq_rr message, without querying WIN SCP 38.

When private MSC 60 receives the complete directory number of mobile station 28, private MSC 60 recognizes it as belonging to a mobile station subscribing to private network 12. Thus, to find mobile station 28, private MSC 60 then transmits a LOCREQ message 710 to Gateway SCP 70. In this case, mobile station 28 is currently registered with public network 12, rather than with private network 12, so Gateway SCP 70 transmits a LOCREQ message 712 to HLR 32. HLR 32 retrieves the data record for mobile station 28 from the information contained in LOCREQ message 712 identifying mobile station 28. In this case, the locator address in the data record indicates that mobile station 28 is being served by MSC 16. Thus, HLR 32 sends a ROUTEREQ message 714 to MSC 16. In response, MSC 16 allocates a TLDN and transmits the TLDN to HLR 32 in a routereq_rr message 716. HLR 32 forwards the TLDN in a locreq_rr message 718 to Gateway SCP 70, and Gateway SCP 70 forwards the TLDN to private MSC 60 in a locreq_rr message 720. Private MSC 60 then routes the call to this TLDN, such as by exchanging ISUP messages 722 with MSC 16. With the call now routed to MSC 16, MSC 16 transmits a signal set 724 to page and alert mobile station 28. Once mobile station 28 answers, a voice path is established between mobile station 64 and mobile station 28.

Although, in the example described above, the abbreviated digit string transmitted by mobile station 64 corresponded to another subscribing mobile station, abbreviated digit strings may also be used for non-subscribing mobile stations or for wireline phones. In such cases, private MSC 60 would simply route the call, such as by exchanging ISUP messages, to the complete directory number it received from orreq_rr message 708.

Additionally, although abbreviated dialing was described above as an example of a typical call origination service, other call origination services may result in other call processing instructions being sent to private MSC 60. For example, another possible call origination service is originating call screening, whereby calls to certain numbers, or calls made during certain times, may be blocked. To apply such services, orreq_rr message 708 would instruct private MSC 60 to either allow or to block the call. Thus, orreq_rr message 708 may contain different types of call processing instructions, depending on the call origination service involved.

Figure 14:
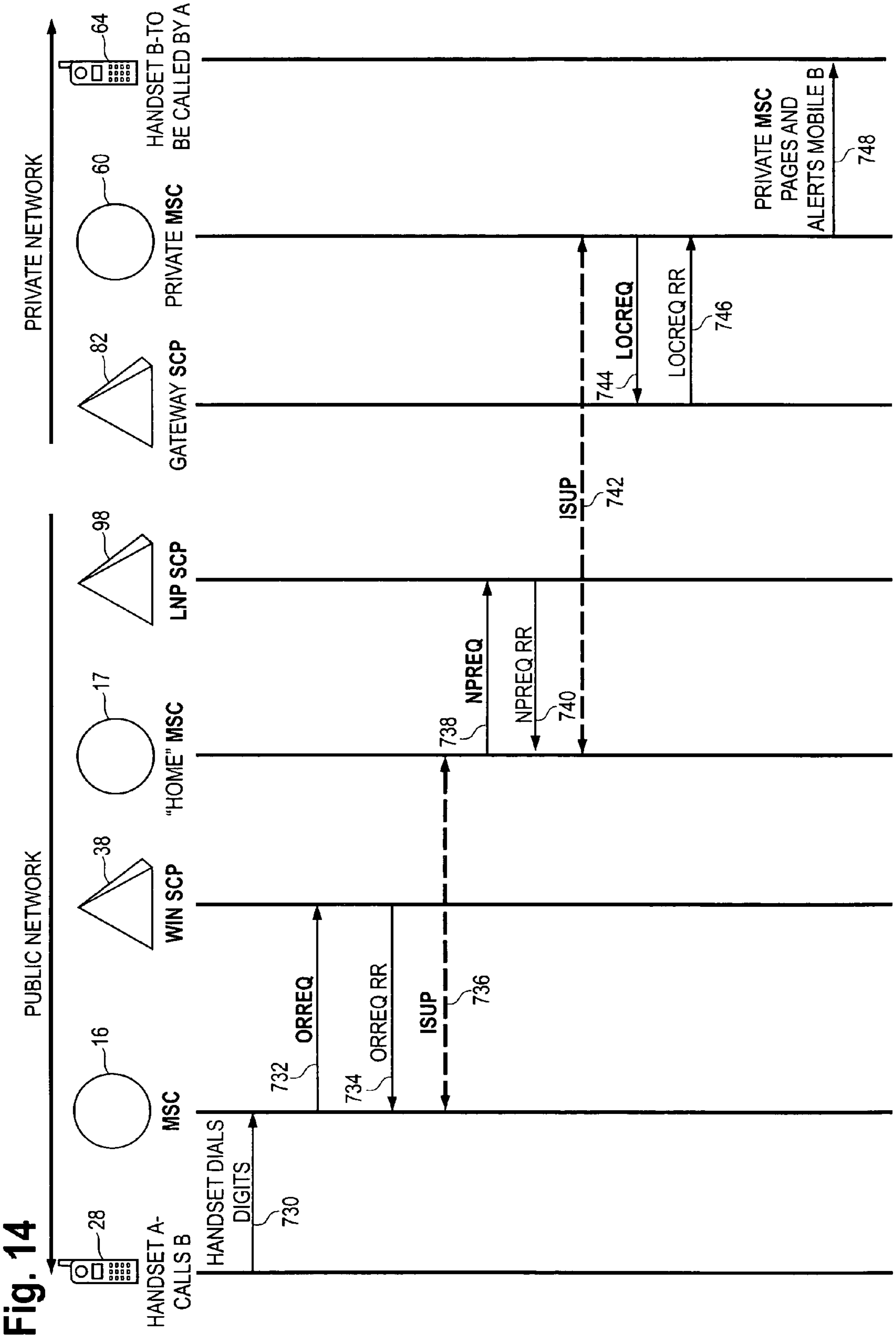
FIG. 14 is a simplified call flow diagram illustrating the process of applying call origination services to a mobile station operating in the public wireless network, in accordance with an exemplary embodiment of the present invention.

Beneficially, the present invention allows call origination services to be available to subscribing mobile stations when they are operating in the public network as well. For example, FIG. 14 illustrates, in simplified form, the call flow for when mobile station 28, a mobile station that subscribes to private network 12, attempts to use abbreviated dialing when it is operating in public network 14. The caller dials an abbreviated digit string for mobile station 64, and mobile station 28 transmits a signal 730 containing the dialed digits. MSC 16 recognizes this as a call origination trigger from the service profile in its VLR 33 that was downloaded from HLR 32 during registration. To obtain call processing instructions, MSC 16 transmits an ORREQ message 732 containing the digit string to either WIN SCP 38 or HLR 32, depending on which network element contains the necessary service logic. In preferred embodiments, WIN SCP 38 contains the service logic. Thus, WIN SCP 38 executes its service logic to obtain the complete directory number of mobile station 64 and transmits the directory number to MSC 16 in an orreq_rr message 734. In the example shown in FIG. 14, this directory number was originally allocated to "home" MSC 17, but then ported to private MSC 60, as described above. Thus, MSC 16 routes the call to "home" MSC 17, such as by exchanging ISUP messages 736. "Home" MSC 17 recognizes the directory number as one that has been ported, so MSC 17 transmits an NPREQ message 738 to LNP SCP 38. LNP SCP 38 obtains a LRN, corresponding to private MSC 60, and transmits it to MSC 17 in an npreq_rr message 740. MSC 17 then routes the call to the LRN, such as by exchanging ISUP messages 742 with private MSC 60. Private MSC 60 then transmits a LOCREQ message 744 to Gateway SCP 70, and Gateway SCP 70 responds with a locreq_rr message 746. In response, private MSC sends a signal set 748 to page and alert mobile station 64.

Notably, the call origination services provided to a subscriber mobile station may differ depending on whether it is operating in the coverage area of private network 12 or public network 14. The differences may come about in several different ways. First, the service profiles used in the public and private networks may differ. Second, different network elements may apply the service logic, depending in which network the subscriber mobile station is operating. For example, Gateway SCP 70 may apply its service logic for subscriber mobile stations operating in private network 12, while WIN SCP 38 may apply its service logic for subscriber mobile stations operating in public network 14. Third, even if WIN SCP 38 supplies the service logic in both networks, WIN SCP 38 may be programmed to apply different service logic depending on whether the ORREQ query originates from a private network MSC or a public network MSC.

In this way, an enterprise may provision some or all of the available call origination services to apply only when operating in private network 12. This may advantageously result in lower cost to the enterprise. Moreover, it would allow users to maintain their own "personal" call origination services for use outside of the work environment, i.e., outside of private network 12.

Call Termination Services

The present invention also beneficially allows call termination services to be applied to a subscribing mobile station, regardless of whether the mobile station is operating in the coverage area of private network 12 or public network 14. Such call termination services may include, without limitation, call termination screening or call forwarding.

Figure 15:
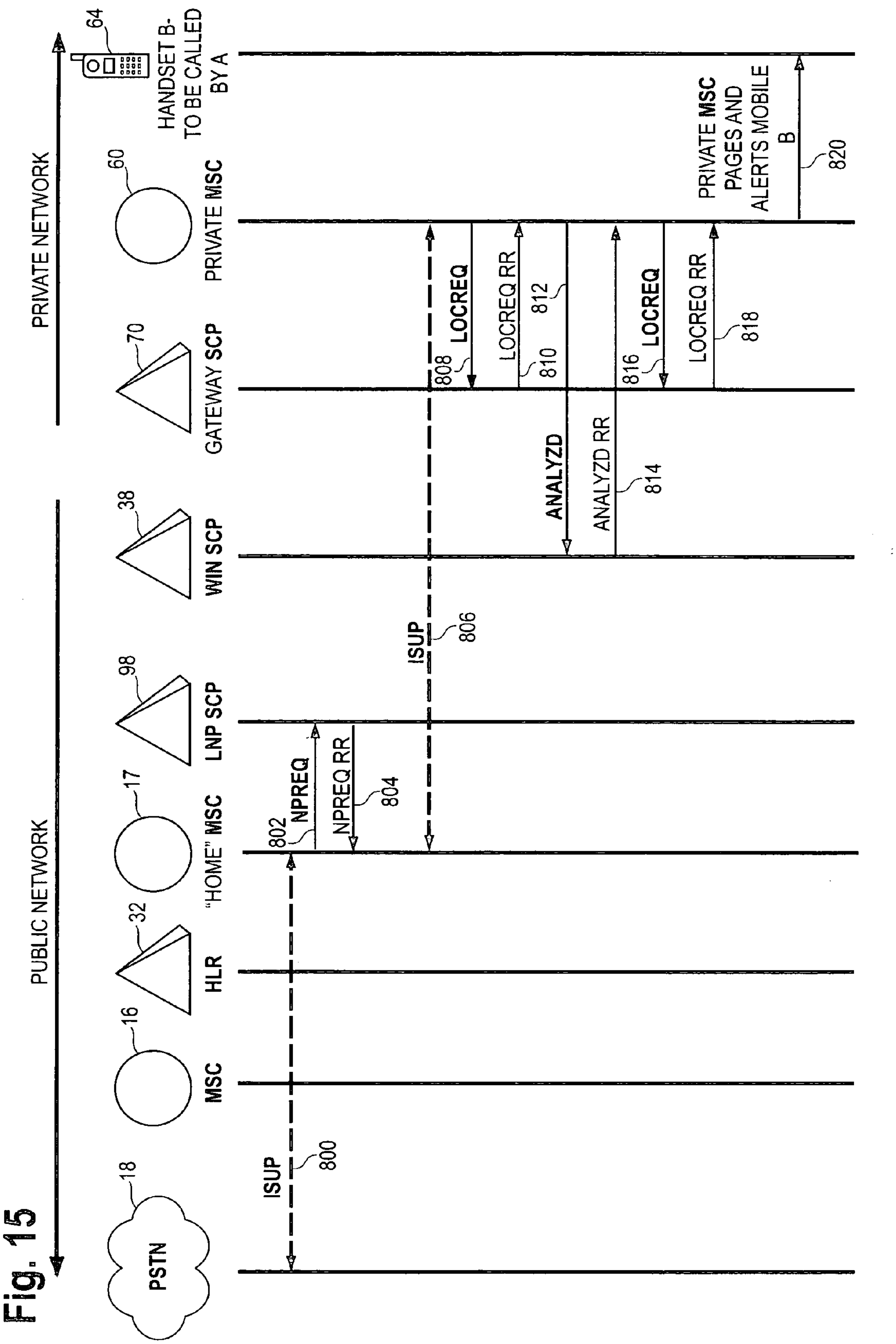
FIG. 15 is a simplified call flow diagram illustrating the process of applying call termination services to a mobile station operating in the private wireless network, in accordance with an exemplary embodiment of the present invention.

FIG. 15 illustrates a simplified exemplary call flow for the case of a call routed through PSTN 18 to mobile station 64. Thus, the call may originate from a wireline station, such as station 92, or from a mobile station not operating in private network 12. The call is routed through PSTN 18, such as by the exchange of ISUP messages 800, to "Home" MSC 17, the MSC for which the directory number of mobile station 64 was originally allocated. MSC 17 then transmits a NPREQ message 802 to LNP SCP 98, and LNP SCP 98 responds with a npreq_rr message 804 containing a LRN corresponding to private MSC 60. MSC 17 then routes the call to this LRN, such as by exchanging ISUP messages 806 with private MSC 60. When the call is routed to private MSC 60, it recognizes a call termination trigger for mobile station 64. The call termination triggers are preferably programmed into private MSC 60 instead of being provided by the service profile for mobile station 64 contained in the VLR 61. To obtain call processing instructions, private MSC 60 sends a LOCREQ message 808 to Gateway SCP 70.

What happens next depends on where the service logic to process the call resides. In one preferred embodiment, WIN SCP 38 contains the necessary service logic. In that case, Gateway SCP 70 sends a locreq_rr message 810 containing a Trigger Address List ("TAL") that instructs private MSC 60 to query WIN SCP 38 to obtain call processing instructions. Private MSC 60 then sends an IS-771 Analyzed Information message ("ANALYZD") 812 to WIN SCP 38. WIN SCP 38 executes its service logic to obtain call processing instructions and transmits the call processing instructions to private MSC 60 in an analyzd_rr message 814. In the simplest case, the call processing instructions would instruct private MSC 60 to terminate the call to mobile station 64. In that case, private MSC 60 would send a LOCREQ message 816 to Gateway SCP 70, and Gateway SCP 70 would respond with a locreq_rr message 818. Private MSC 60 would then send a signal set 820 to page and alert mobile station 64. In other cases, the call processing instructions contained in analyzd_rr message 814 may instruct private MSC 60 to block the call, to forward the call to some other number, or to perform some other function, depending on the call termination service.

In another embodiment, the service logic to provide some or all call termination services may reside on Gateway SCP 70. In that case, in response to LOCREQ message 808, Gateway SCP 70 would return a TAL in locreq_rr message 810 that points to Gateway SCP 70. Thus, private MSC 60 would send ANALYZD message 812 to Gateway SCP 70, which would execute its own service logic to formulate call processing instructions, without requiring any queries to WIN SCP 38. Gateway SCP 70 would then forward the call processing instructions to private MSC 60 in analyzd_rr message 814.

Figure 16:
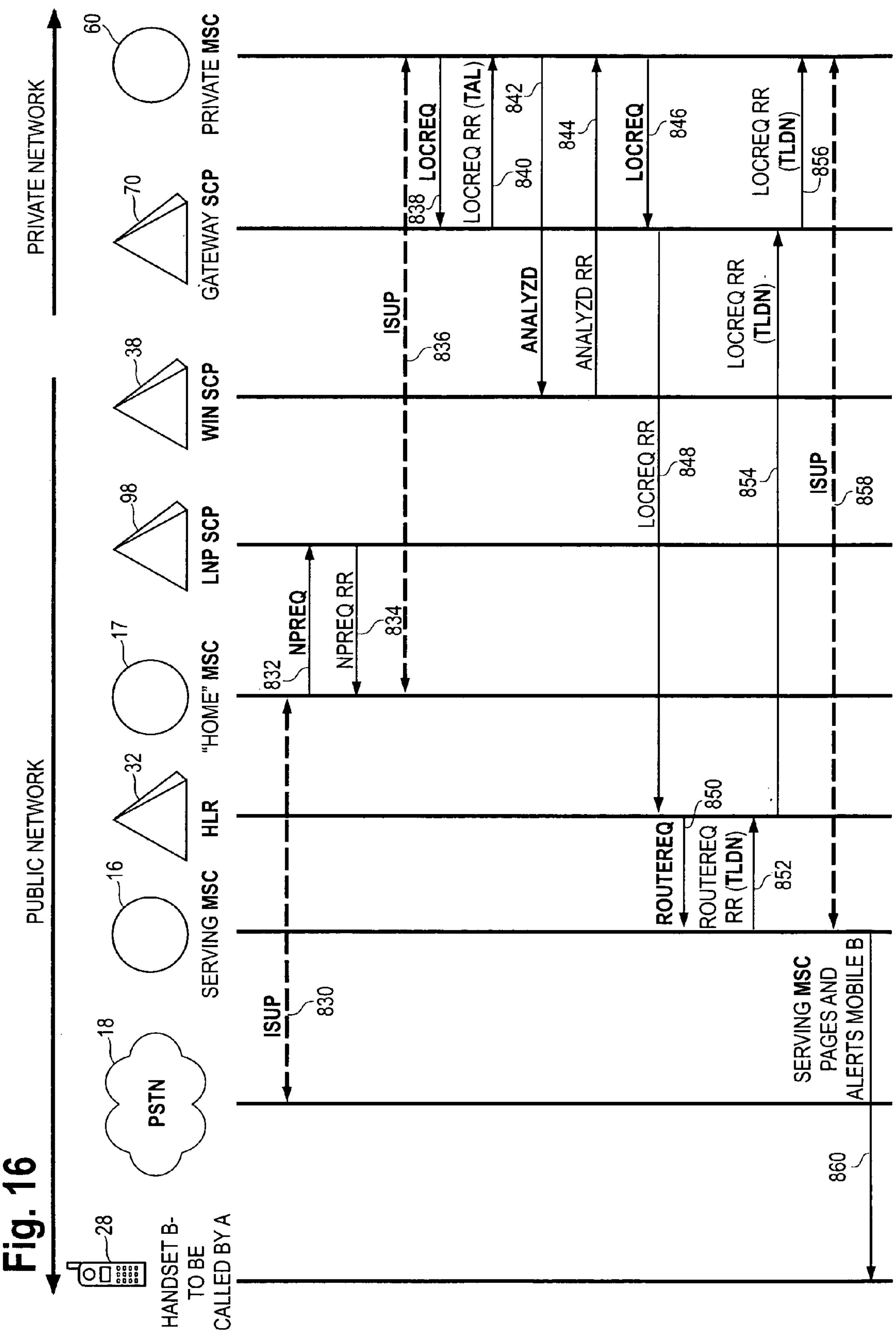
FIG. 16 is a simplified call flow diagram illustrating the process of applying call termination services to a mobile station operating in the public wireless network, in accordance with an exemplary embodiment of the present invention.

FIG. 16 illustrates a simplified exemplary call flow applying call termination services to mobile station 28, a subscriber of private network 12, while it is operating in the coverage area of public network 14. A call for mobile station 28 is routed through PSTN 18 to "home" MSC 17, such as by exchanging ISUP messages 830. "Home" MSC 17 then transmits an NPREQ message 832 to LNP SCP 98, and LNP SCP 98 responds with a npreq_rr message 834 containing a LRN corresponding to private MSC 60. MSC 17 routes the call to private MSC 60, such as by exchanging ISUP messages 836. When private MSC 60 receives the call, it recognizes a call termination trigger and sends a LOCREQ message 838 to Gateway SCP 70 to receive call processing instructions. In the case where WIN SCP 38 has the necessary service logic to provide the call termination service, Gateway SCP 70 sends a locreq_rr message 840 to private MSC 60 containing a TAL instructing private MSC 60 to query WIN SCP 38. In response, private MSC 60 sends an ANALYZD message 842 to WIN SCP 38. WIN SCP 38 executes its service logic to obtain call processing instructions and forwards the call processing instructions to private MSC 60 in an analyzd_rr message 844.

In the simplest case, analyzd_rr message 844 would simply instruct private MSC 60 to put the call through. In that case, private MSC 60 sends a LOCREQ message 846 to Gateway SCP 70 to find mobile station 28. Because mobile station 28 is registered with public network 14, rather than private network 12, Gateway SCP 70 sends a LOCREQ message 848 to HLR 32. From the information contained in LOCREQ message 848, HLR 32 identifies mobile station 28 as the destination of the call. From the locator address in the data record for mobile station 28, HLR 32 then determines that MSC 16 is currently serving mobile station 28. Thus, HLR 32 sends a ROUTEREQ message 850 to MSC 16. In response, MSC 16 allocates a TLDN and forwards it to HLR 32 in a routereq_rr message 852. HLR 32, in turn, forwards the TLDN in a locreq_rr message 854 to Gateway SCP 70, and Gateway SCP 70 forwards the TLDN in a locreq_rr message 856 to private MSC 60. Private MSC 60 then routes the call to this TLDN, such as by exchanging ISUP messages with MSC 16. Once the call is routed to MSC 16, it sends a signal set 860 to page and alert mobile station 860.

Feature Code Updates

Many wireless networks enable mobile station users to update some of their available features by dialing a feature code string that typically begins with a "*" digit. As a typical example, a user may be able to dial the digit string "*72" in his mobile station, followed by a 10-digit directory number, to have calls forwarded to that 10-digit directory number. The present invention beneficially allows mobile stations that subscribe to the private network to use such feature code updates, whether the mobile station is operating in the coverage area of the private network or the public network.

Figure 17:
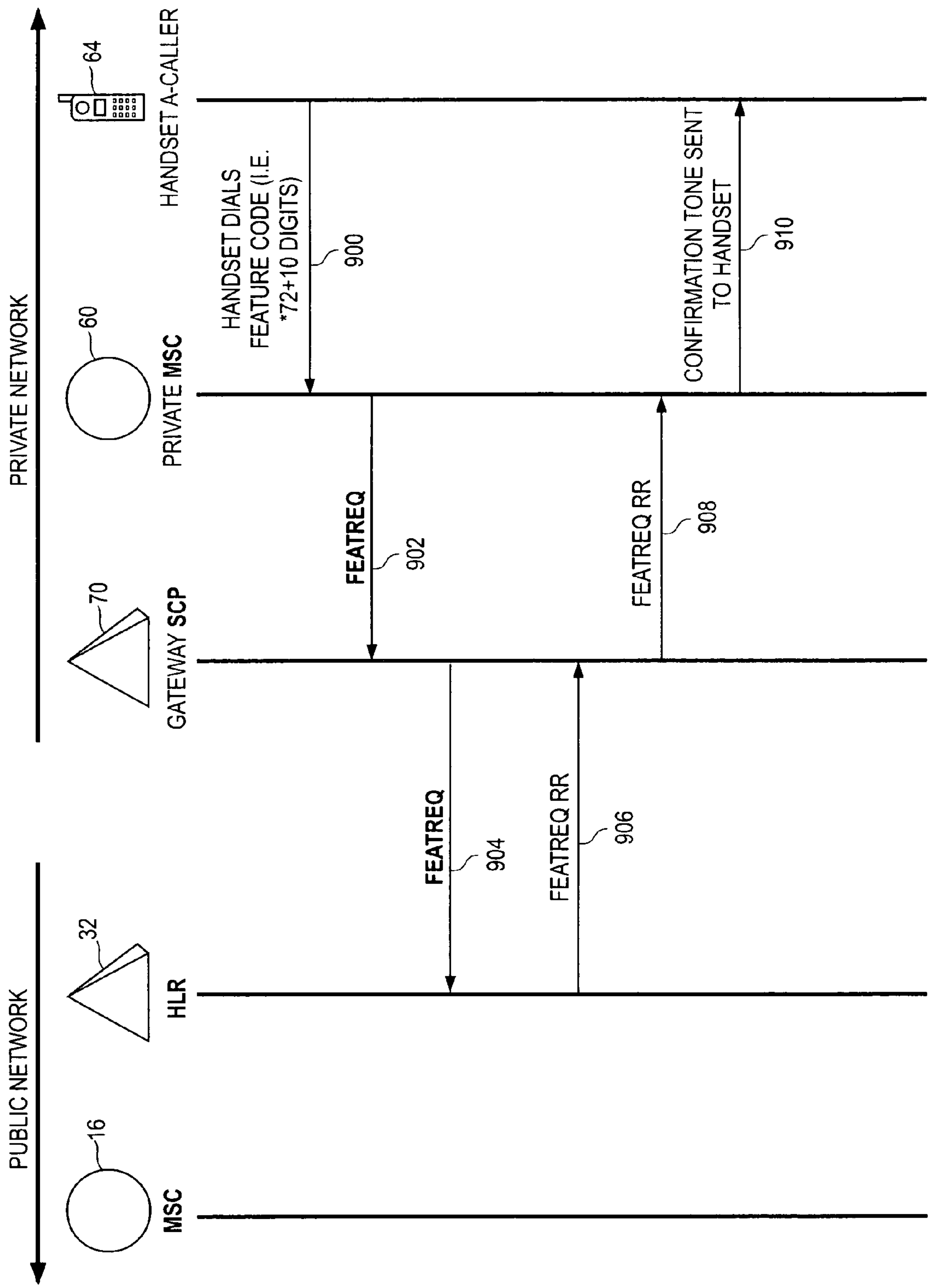
FIG. 17 is a simplified call flow diagram illustrating the process of using a feature code from a mobile station operating in the private wireless network, in accordance with an exemplary embodiment of the present invention.

FIG. 17 illustrates a simplified exemplary call flow that may be applied when mobile station 64 dials a feature code while operating in the coverage are of private network 12. The user of mobile station 64 dials the feature code, such as "*72" followed by a 10-digit number, and mobile station 64 responsively transmits a signal 900 containing the feature code. Private MSC 60 receives the feature code and sends an IS-41 Feature Request ("FEATREQ") message 902, identifying mobile station 64, to Gateway SCP 70. Gateway SCP 70 then updates the service profile for mobile station 64 contained in database 74 to reflect the update requested by the feature code. As a result, Gateway SCP 70 will be able to apply the updated service for mobile station 64 when it is operating in the coverage area of private network 12. Thus, for the example of a feature code update requesting call forwarding to a given number, Gateway SCP 70 will be able to instruct private MSC 60 to forward the call to the given number, in response to a LOCREQ message from private MSC 60.

Preferably, Gateway SCP 70 also sends a FEATREQ message 904, containing the feature code string and identifying mobile station 64, to HLR 32, so that the requested update will also apply when mobile station 64 is operating in the coverage area of public network 14. HLR 32 then updates the service profile for mobile station 64 contained in database 42 to reflect the requested update. HLR 32 also sends to Gateway SCP 70 an IS-41 feature request return result ("featreq_rr") message 906 to confirm the update. Gateway SCP 70, in turn, also sends a featreq_rr message 908 to private MSC 60 to confirm the update. In response, private MSC 60 causes a confirmation signal 910 to be sent to mobile station 64. When mobile station 64 receives confirmation signal 910, it preferably provides a user-discernible indication, such as a tone or a visual display, that the feature update has been processed.

Figure 18:
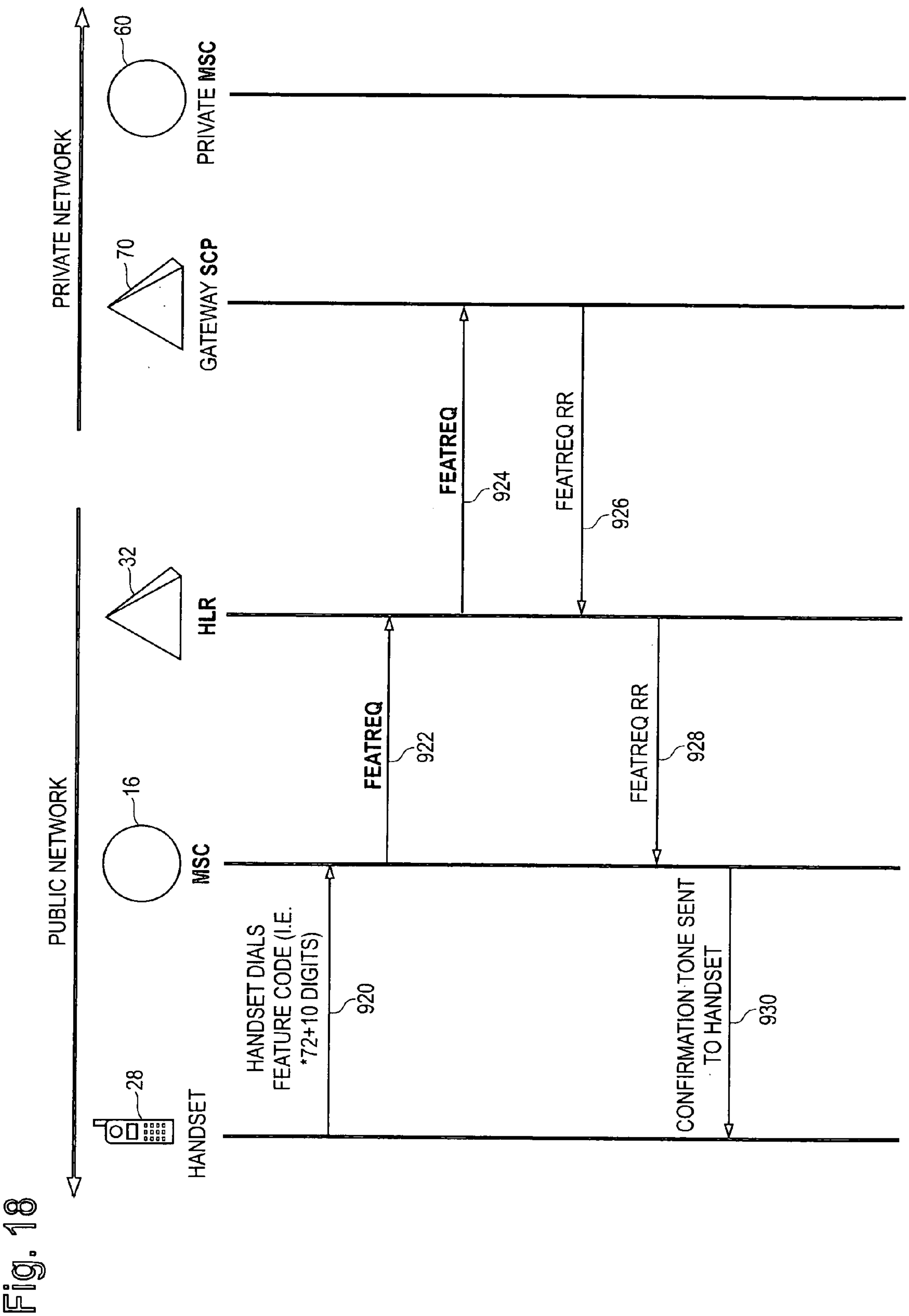
FIG. 18 is a simplified call flow diagram illustrating the process of using a feature code from a mobile station operating in the public wireless network, in accordance with an exemplary embodiment of the present invention.

FIG. 18 shows, in simplified form, an exemplary call flow for a mobile station 28 requesting a feature code update while it is in the coverage area of public network 14 being served by MSC 16. The user dials the feature code, and mobile station 28 responsively transmits a signal 920 containing the feature code. MSC 16 receives the feature code and transmits it to HLR 32 in a FEATREQ message 922. HLR 32 then updates the service profile for mobile station 28 contained in database 42 to reflect the requested update. In some embodiments, HLR 32 may also forward the feature code in a FEATREQ message 924 to Gateway SCP 70 so that Gateway SCP 70 can also update the service profile for mobile station 28. Gateway SCP 70 would then send back a featreq_rr message 926. In other embodiments, HLR 32 would not forward the feature code to Gateway SCP 70 but would simply send a featreq_rr message 928 back to MSC 16 after updating the service profile for mobile station 28. MSC 16 then causes a confirmation signal 930 to be sent to mobile station 28.

Figure 19:
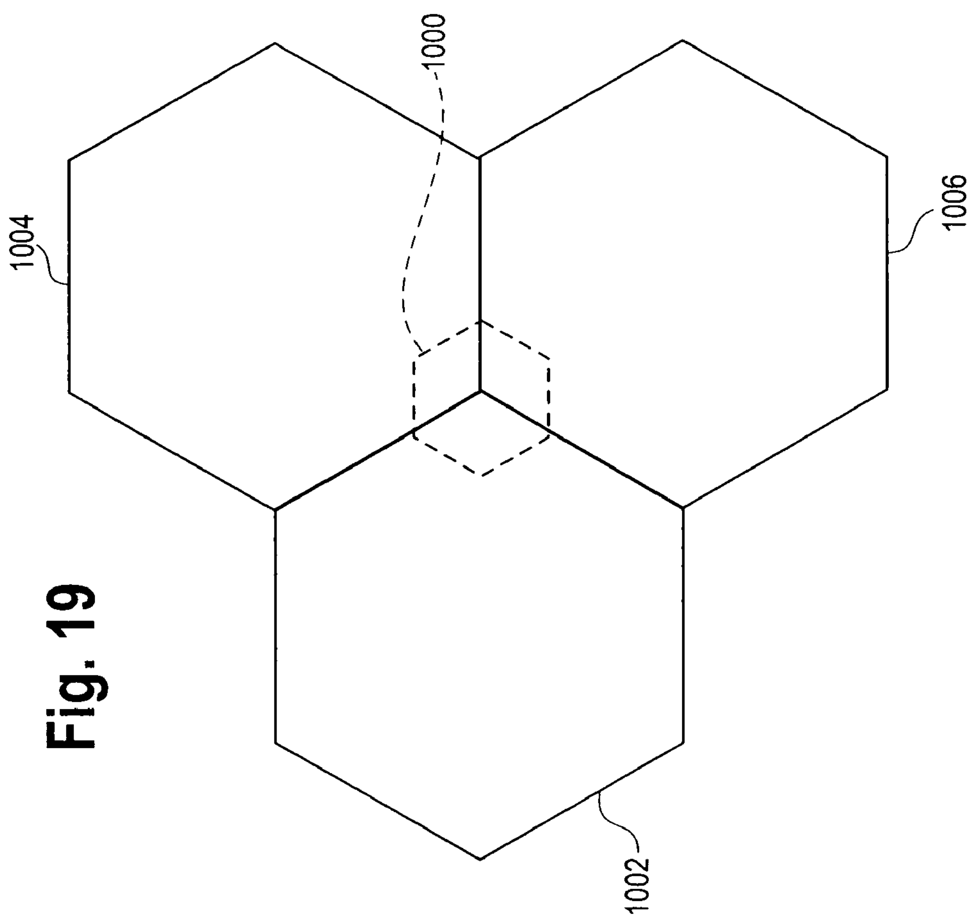
FIG. 19 is an idealized schematic diagram illustrating the overlap of the wireless coverage area provided by the private BTS shown in FIG. 1 with the wireless coverage areas provided by three BTSs of the public wireless network shown in FIG. 1, in accordance with an exemplary embodiment of the present invention.

Handoffs Between the Private and Public Wireless Networks and within the Private Wireless Network Preferably, the wireless coverage area provided by private network 12 overlaps the wireless coverage area provided by public wireless network 14. A benefit of providing such an overlapping wireless coverage area is that it facilitates the handoff of calls between private network 12 and public network 14. FIG. 19 shows an example of such an overlapping wireless coverage area. In FIG. 19, the wireless coverage area provided by private BTS 62 is idealized as a hexagonal "pico" cell 1000. The wireless coverage areas provided by BTSs 22, 24, and 26 are idealized as hexagonal "macro" cells 1002, 1004, and 1006, respectively. In the example shown in FIG. 19, "pico" cell 1000 overlaps all three "macro" cells 1002, 1004, and 1006. However, in general, "pico" cell 1000 may overlap a greater or fewer number of the "macro" cells of network 20. For example, "pico" cell 1000 may be wholly within one of "macro" cells 1002–1006. Also, though the wireless coverage areas are idealized as hexagons in FIG. 19, the shape of the actual effective wireless coverage areas provided by private BTS 62 and BTSs 22–26 will depend on a number of factors, including the directionalities of the antennas used, and the local topography, and the presence of obstructions, such as buildings.

The details of the handoff process will depend on the wireless technology used, such as AMPS, TDMA, or CDMA. In AMPS systems, the BTSs monitor the signal strengths of the mobile stations with which they communicate to determine when to initiate handoffs. When a BTS finds that the signal strength of a mobile station falls below a threshold value, the BTS informs its controlling MSC. The controlling MSC then orders the MSCs that control the BTSs of "neighboring" cells to monitor the signal strength of the mobile station and to report back the results. In IS-41, this is done by the controlling MSC sending a "HandoffMeasurementRequest" invoke message to the other MSCs "neighboring" cells. The other MSCs would then provide the requested measurement results in a "HandoffMeasurementRequest" return result message. The identity of the "neighboring" cells would be predetermined. Thus, for the configuration shown in FIG. 19, private MSC 60 would normally define cells 1002–1006 as the "neighbors" of cell 1000. When private BTS 62 detects that the signal strength from a mobile station with which it is in communication has fallen below a threshold value, private MSC 60 would send a "HandoffMeasurementRequest" message to MSC 16. Similarly, in public wireless network 14, "pico" cell 1000 would be considered a "neighbor" to cells 1002–1006, at least for mobile stations that subscribe to private network 12. Thus, when one of BTSs 22–26 detects that the signal strength from a mobile station with which it is in communication has fallen below a threshold value, MSC 16 would send a "HandoffMeasurementRequest" message to private MSC 60. The results of the signal strength measurements may indicate that the mobile station is in better wireless communication with another BTS, in which case the controlling MSC may initiate a handoff in the manner described below. In this way, when a mobile station in communication with BTS 62 starts to move out of range, as indicated by its signal strength having fallen below a threshold value, the mobile station can be handed off to one of BTSs 22 26. Similarly, if the signal strength of a mobile station in communication with BTS 24 decreases below a threshold value, because the mobile station has entered a building in the coverage area of private BTS 62, then the mobile station can be handed off to private BTS 62.

In contrast, TDMA systems typically use mobile assisted handoff (MAHO). In the MAHO approach, each mobile station periodically monitors the signal strength of the control channel of the BTS with which it is currently communicating, as well as the control channels of cells in a "neighbor list." The mobile station periodically reports these signal strength measurements to the BTS with which it is communicating. The BTS forwards the measurements to the controlling MSC, and the controlling MSC, in turn, initiates handoffs based on the measurements. Typically, the MSC would initiate a handoff when the mobile station reports a signal strength for a neighboring cell that is higher than that of the current cell. The "neighbor list" is normally transmitted to the mobile station by the BTS with which it is currently communicating. Thus, for the configuration shown in FIG. 19, cells 1002–1006 would normally be included in the neighbor list for cell 1000. Similarly, cell 1000 would normally be included in the neighbor lists of cells 1002–1006 that are provided to mobile stations that subscribe to private network 12. Thus, when a mobile station in communication with private BTS 62 starts to move out of range, as indicated by the mobile station reporting a higher signal strengths for BTS 24, for example, then private MSC 60 would normally initiate a handoff to BTS 24. Similarly, when a mobile station measures a higher signal strength for private BTS 62 than for BTS 24, MSC 16 would normally initiate a handoff to private BTS 62.

CDMA systems also normally use a MAHO approach that is similar to that used by TDMA systems. Specifically, CDMA mobile stations monitor the strengths of the pilot channels of the cell (or cells) with which it is currently communicating, as well as the pilot channels of the cells in a "neighbor list." The CDMA mobile stations periodically report the measured signal strengths to the BTS, which, in turn, forwards the information to the MSC controlling it. The MSC will typically initiate a handoff when the mobile station reports a signal strength for a neighboring cell that is higher than that of the current cell (or cells). As with TDMA systems, the BTSs normally transmit the neighbor lists to the mobile stations. Given the configuration shown in FIG. 19, the neighbor lists for CDMA mobile stations would be similar to that described above for TDMA mobile stations.

CDMA systems also take advantage of a CDMA mobile station's ability to communicate on more than one channel at a time to perform, to the extent possible, "soft" handoffs. During a "soft" handoff, a mobile station in communication with a first cell begins to communicate with a second cell. The communication with the first cell can be subsequently dropped when the signal level becomes too low. Soft handoffs are particularly desirable as they provide a "make before break" connection that is almost imperceptible to the user. Soft handoffs between "pico" cell 1000 and one of "macro" cells 1002–1006 would not normally be possible because they are controlled by different MSCs. However, a "hard" handoff can be effected, as described below.

Figure 20:
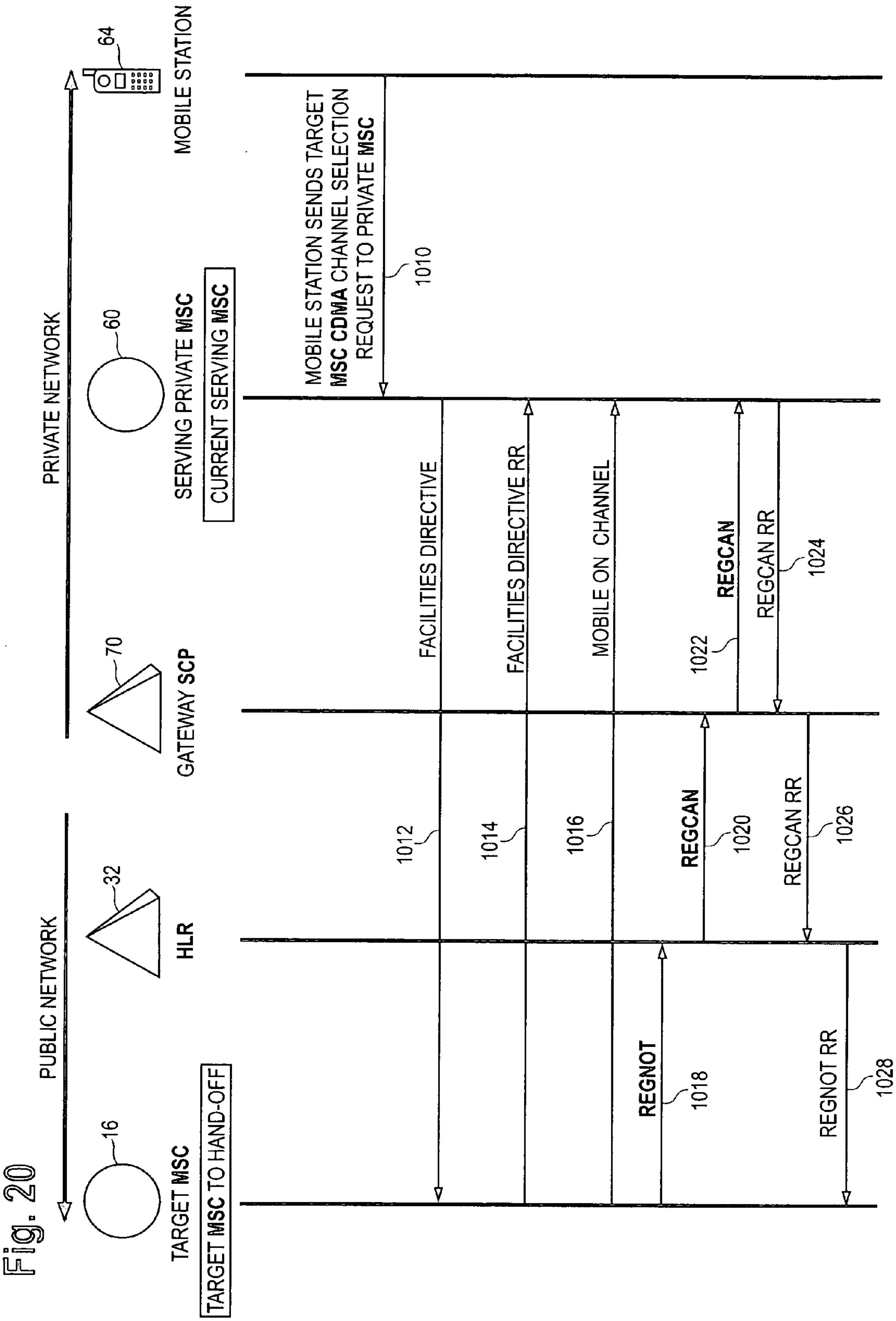
FIG. 20 is a simplified call flow diagram illustrating the process of handing off a call from the private wireless network shown in FIG. 1 to the public wireless network shown in FIG. 1, given the overlapping wireless coverage areas illustrated in FIG. 19, in accordance with an exemplary embodiment of the present invention.

FIG. 20 shows a simplified call flow for the process of handing off mobile station 64 from private MSC 60, the MSC currently serving mobile station 64 in private network 12, to MSC 16, the target MSC in public network 14, given the overlapping wireless coverage areas illustrated in FIG. 19. More particularly, the call flow shown in FIG. 20 assumes that both the private network 12 and public network 14 use the preferred CDMA format. In the example of FIG. 20, mobile station 64 is being handed off from cell 1000 to one of cells 1002–1006.

The process begins when mobile station 64 measures the signal strength of the pilot channel of one of BTSs 22–26 as being sufficiently high for communication. For example, mobile station 64 may measure the pilot channel of BTS 22, corresponding to cell 1002, as being sufficiently high. Mobile station 64 then transmits a Channel Selection Request signal 1010 requesting communication on one of the channels of BTS 22. In response, private MSC 60 transmits an IS-41 Facilities Directive message 1012 to MSC 16 in order to request a handoff. MSC 16 transmits an IS-41 Facilities Directive Return Result message 1014 to private MSC 60 to accept the handoff to the requested channel. Once MSC 16 detects mobile station 64 on the new channel, MSC 16 completes a voice path between private MSC 60 and MSC 16, to prevent calls from being dropped. MSC 16 then sends an IS-41 Mobile On Channel message 1016 to private MSC 60 to confirm that mobile station 64 has successfully moved to the new channel.

MSC 16 also transmits a REGNOT message 1018, identifying mobile station 64, to HLR 32 in order to register mobile station 64 with public network 14. Because mobile station 64 had previously been registered in private network 12, the locator address in HLR 32 for mobile station 64 would identify Gateway SCP 70 before HLR 32 receives REGNOT message 1018. Thus, in response to REGNOT message 1018, HLR 32 changes the locator address for mobile station 64 to identify MSC 16. HLR 32 also sends an IS-41 Registration Cancellation ("REGCAN") message 1020, identifying mobile station 64, to Gateway SCP 70 in order to cancel the registration of mobile station 64 in private network 12. As a result, the locator address in Gateway SCP 70 for mobile station 64 would no longer identify private MSC 60. Gateway SCP 70, in turn, sends a REGCAN message 1022, identifying mobile station 64, to private MSC 60. In response, private MSC 60 typically deletes the entry for mobile station 64 in its VLR 61. Private MSC 60 responds by sending an IS-41 Registration Cancellation Return Result ("regcan_rr") message 1024 to Gateway SCP 70. Gateway SCP 70, in turn, sends a regcan_rr message 1026 to HLR 32. Finally, HLR 32 sends a regnot_rr message 1028 to MSC 16 to confirm that registration was successful.

By this communication between HLR 32 and Gateway SCP 70, the registration of mobile station 64 may be switched over from private network 12 to public network 14 during the course of the handoff. Moreover, the handoff occurs without calls being dropped.

Figure 21:
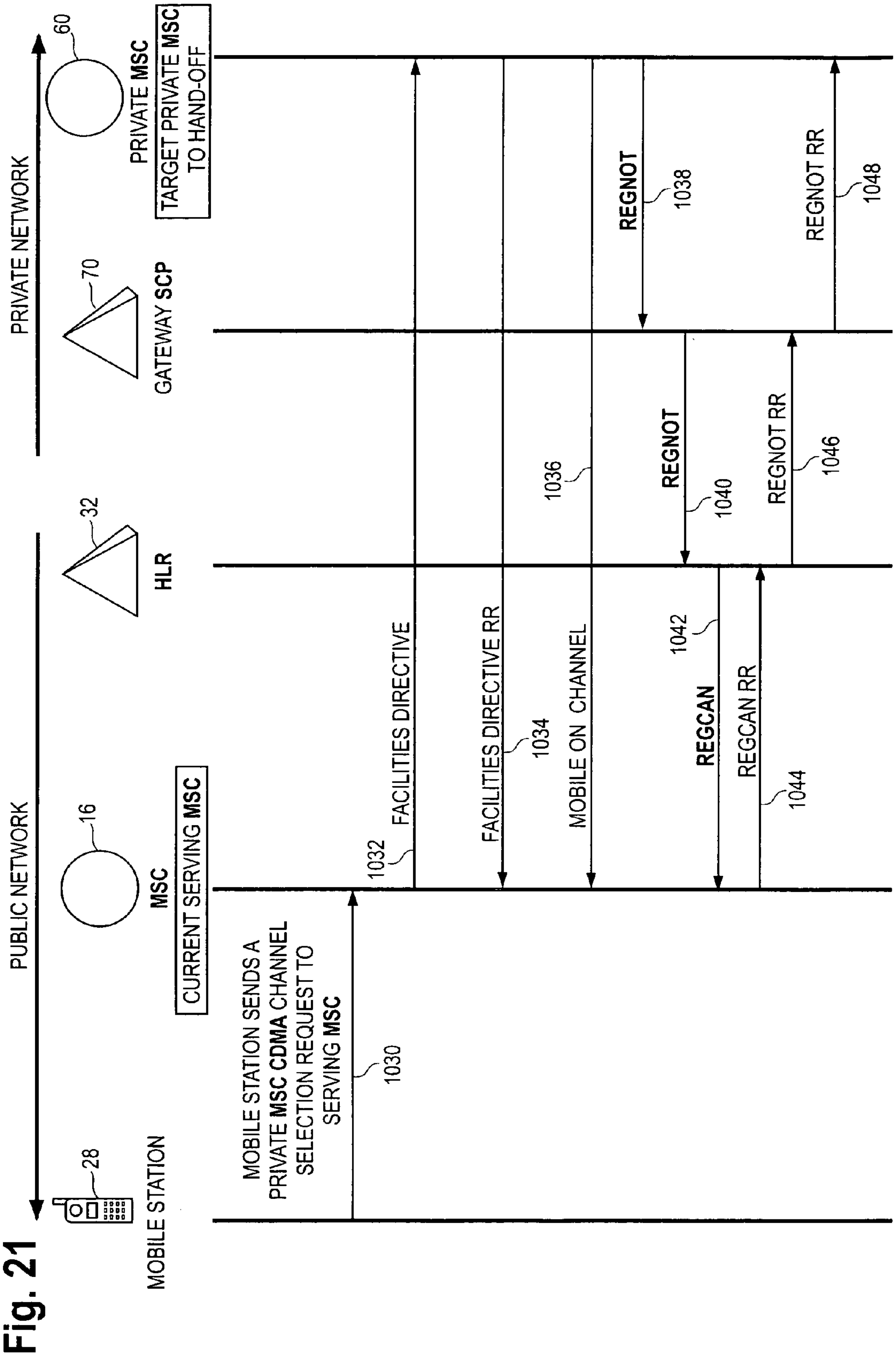
FIG. 21 is a simplified call flow diagram illustrating the process of handing off a call from the public wireless network shown in FIG. 1 to the private wireless network shown in FIG. 1, given the overlapping wireless coverage areas illustrated in FIG. 19, in accordance with an exemplary embodiment of the present invention.

Mobile stations may also be handed off from the public network to the private network. FIG. 21 illustrates a simplified call flow for handing off mobile station 28, which is being served by MSC 16 in public network 14, to private MSC 60 in private network 12. The process begins when mobile station 28 detects the signal strength of private BTS 62 as being sufficiently high for good communication. Mobile station 28 then transmits a Channel Selection Request 1030 to MSC 16 to request a handoff to private BTS 62. In response, MSC 16 sends a Facilities Directive message 1032 to private MSC 60 to request a handoff. Private MSC 60 responds with a Facilities Directive Return Result 1034 to confirm the availability of the requested channel. Once private MSC 60 detects mobile station 28 on the new channel, it completes a voice circuit between MSC 16 and private MSC 60. Private MSC 60 also sends a Mobile On Channel message 1036 to MSC 16 to confirm that mobile station 28 is on the new channel.

Private MSC 60 also sends a REGNOT message 1038, identifying mobile station 28, to Gateway SCP 70 to register mobile station 28 with private network 12. In response, Gateway SCP 70 updates the locator address for mobile station 28 to identify private MSC 60. Gateway SCP 70 also sends a REGNOT message 1040, identifying mobile station 28, to HLR 32 to notify public network 14 that mobile station 28 is now operating in the coverage area of private network 12. In response, HLR 32 updates the locator address for mobile station 28 to identify Gateway SCP 70. HLR 32 also sends a REGCAN message 1042, identifying mobile station 28, to MSC 16. MSC 16 then deletes the entry for mobile station 28 in its VLR 33 and sends a regcan_rr message 1044 to HLR 32. HLR 32, in turn, sends a regnot_rr message 1046 to Gateway SCP 70, and Gateway SCP 70 sends a regnot_rr message 1048 to private MSC 60 to confirm that the registration process is complete.

In this way, mobile station 28 becomes registered with private network 12 in the course of a handoff to private network 12. Moreover, the handoff may occur without calls being dropped.

Figure 22:
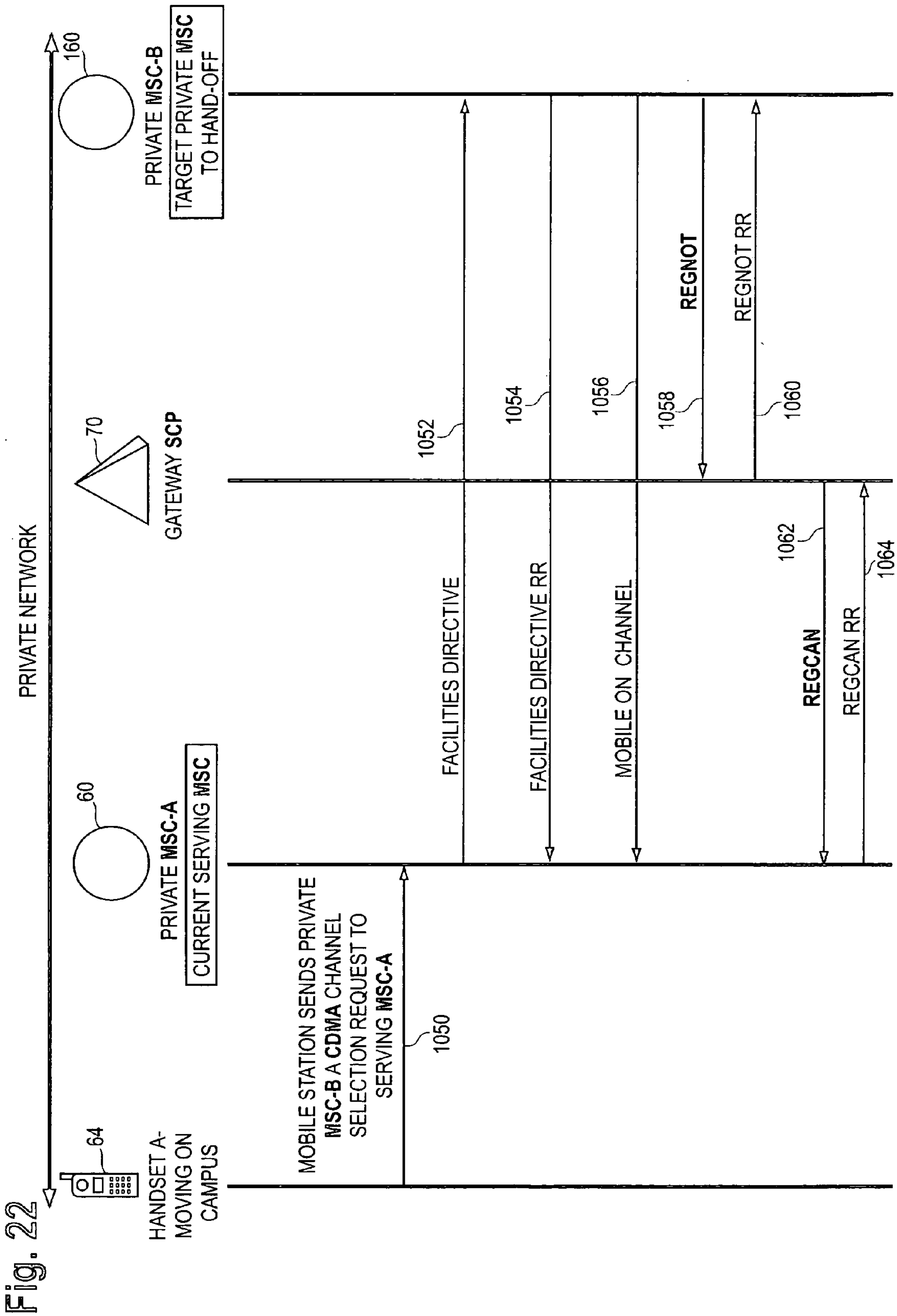
FIG. 22 is a simplified call flow diagram illustrating the process of handing off a call between the two private MSCs of the private wireless network shown in FIG. 5, in accordance with an exemplary embodiment of the present invention.

Mobile stations may also be handed off between different MSCs in the private network. FIG. 22 illustrates a simplified call flow that may be used to hand off a mobile station from one MSC to another in a private network, such as private network 212, shown in FIG. 5. The process beings when mobile station 64, currently being served by private MSC 60, measures the signal strength of the pilot channel of private BTS 162, controlled by private MSC 160, as being above a threshold level. Mobile station 64 transmits a Channel Selection Request signal to private MSC 60. Private MSC 60, in turn, sends a Facilities Directive message 1052 to private MSC 160 to request a handoff. Private MSC 160 accepts the handoff by responding with a Facilities Directive Return Result message 1054. Once private MSC 160 detects mobile station 64 on the new channel, it completes a voice circuit between private MSC 60 and private MSC 160 and sends a Mobile On Channel message 1056 to private MSC 60.

Private MSC 160 also sends a REGNOT message 1058 to Gateway SCP 70 to notify it of the new location of mobile station 64. In response, Gateway SCP 70 updates the locator address for mobile station 64 to identify private MSC 160 and send a regnot_rr message 1060 to private MSC 160. Gateway SCP 70 also sends a REGCAN message 1062 to private MSC 60. In response, Private MSC 60 deletes the entry for mobile station 64 from its VLR 61 and sends back a regcan_rr message 1064. Thus, handoffs within private network 12 do not require any signaling to HLR 32, thereby beneficially reducing the traffic load on public network 14 that would otherwise occur.

Short Message Delivery

Figure 23:
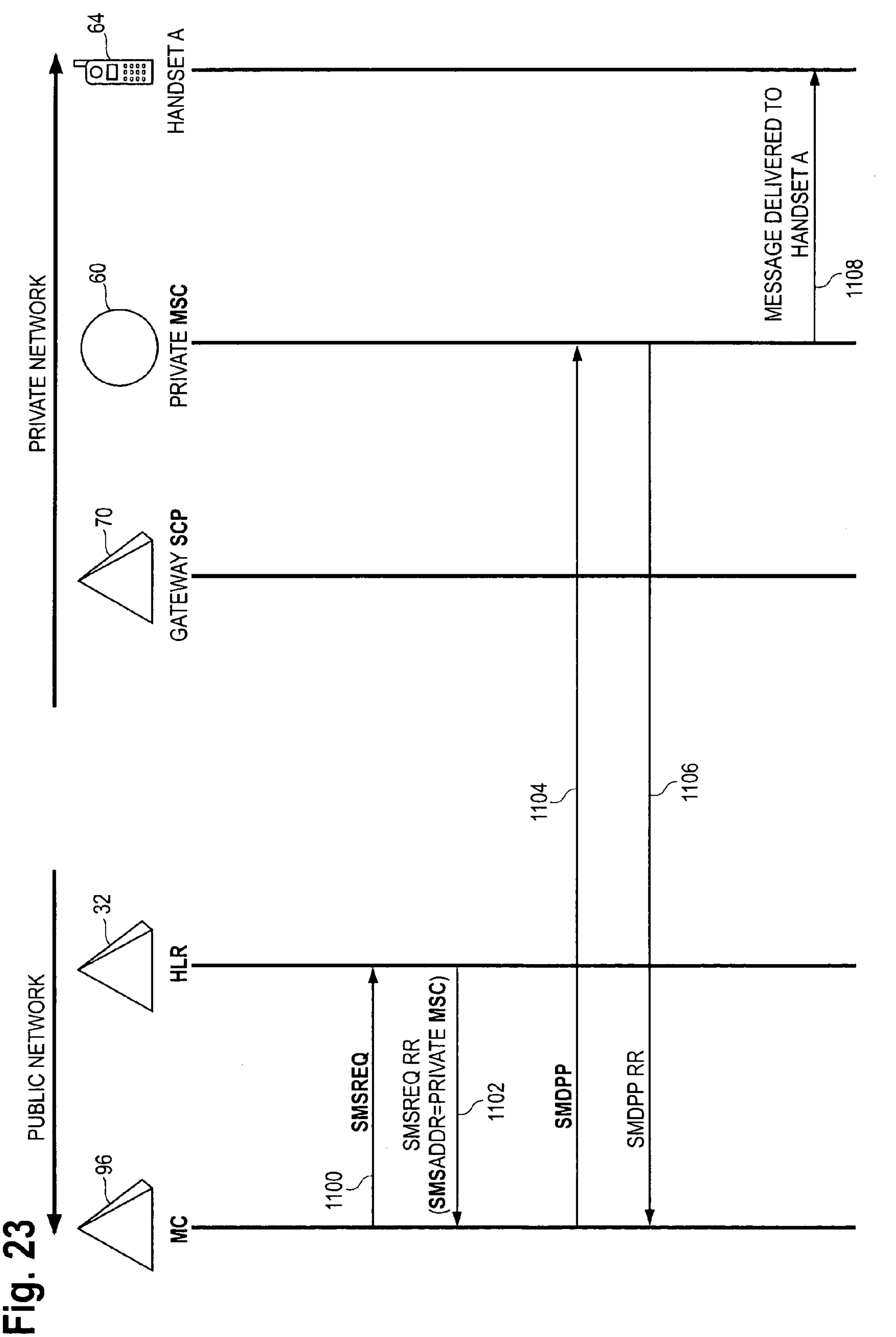
FIG. 23 is a simplified call flow diagram illustrating the process of delivering a short message to a mobile station when it is active in the private wireless network, in accordance with an exemplary embodiment of the present invention.

The present invention also allows short messages to be sent to mobile stations, whether they are operating in the public network or the private network. FIG. 23 illustrates a simplified call flow for delivering a short message to mobile station 64 operating in private network 12. To deliver a short message to mobile station 64, Message Center 96 sends an IS-41 SMS Request message 1100 HLR 32 to locate mobile station 64. SMS Request message 1100 typically identifies mobile station 64 by its MIN. In response, HLR 32 retrieves the data record for mobile station 64 and checks its status. If mobile station 64 is active, i.e., available to receive short messages, then HLR 32 retrieves the SMS address ("SMSaddr") for mobile station 64 that was stored when mobile station 64 registered, and HLR 32 transmits the SMSaddr to Message Center 96 in an IS-41 SMS Request Return Result ("smsreq_rr") message 1102. The SMSaddr is simply an address that Message Center 96 may use to deliver the short message to mobile station 64. When mobile station 64 is operating in private network 12, the SMSaddr may correspond to private MSC 60. Alternatively, the SMSaddr may correspond to another element in private network 12, such as private BSC 68. However, the SMSaddr for mobile station 64 would not typically correspond to Gateway SCP 70, which is identified by the locator address in HLR 32 for mobile station 64, because Gateway SCP 70 would typically not be able receive short messages. Thus, the call flow shown in FIG. 23 is premised on the usual situation of a mobile station's locator address being different than its SMS address. On the other hand, if mobile station 64 were operating in public network 14, the SMSaddr would typically correspond to the MSC currently serving it, or it may correspond to some other element in public network 14.

In the example shown in FIG. 23, the SMSaddr corresponds to private MSC 60. Thus, in the next step, Message Center 96 sends the short message in an IS-41 SMS Delivery Point-To-Point ("SMDPP") message 1104 to the SMSaddr, which, in this case, correspond to private MSC 60. Private MSC 60 acknowledges receipt by sending back an IS-41 SMS Delivery Point-To-Point Return Result ("smdpp_rr") message 1106. Private MSC 60 also sends a signal 1108 to mobile station 64 to deliver the short message.

Figure 24:
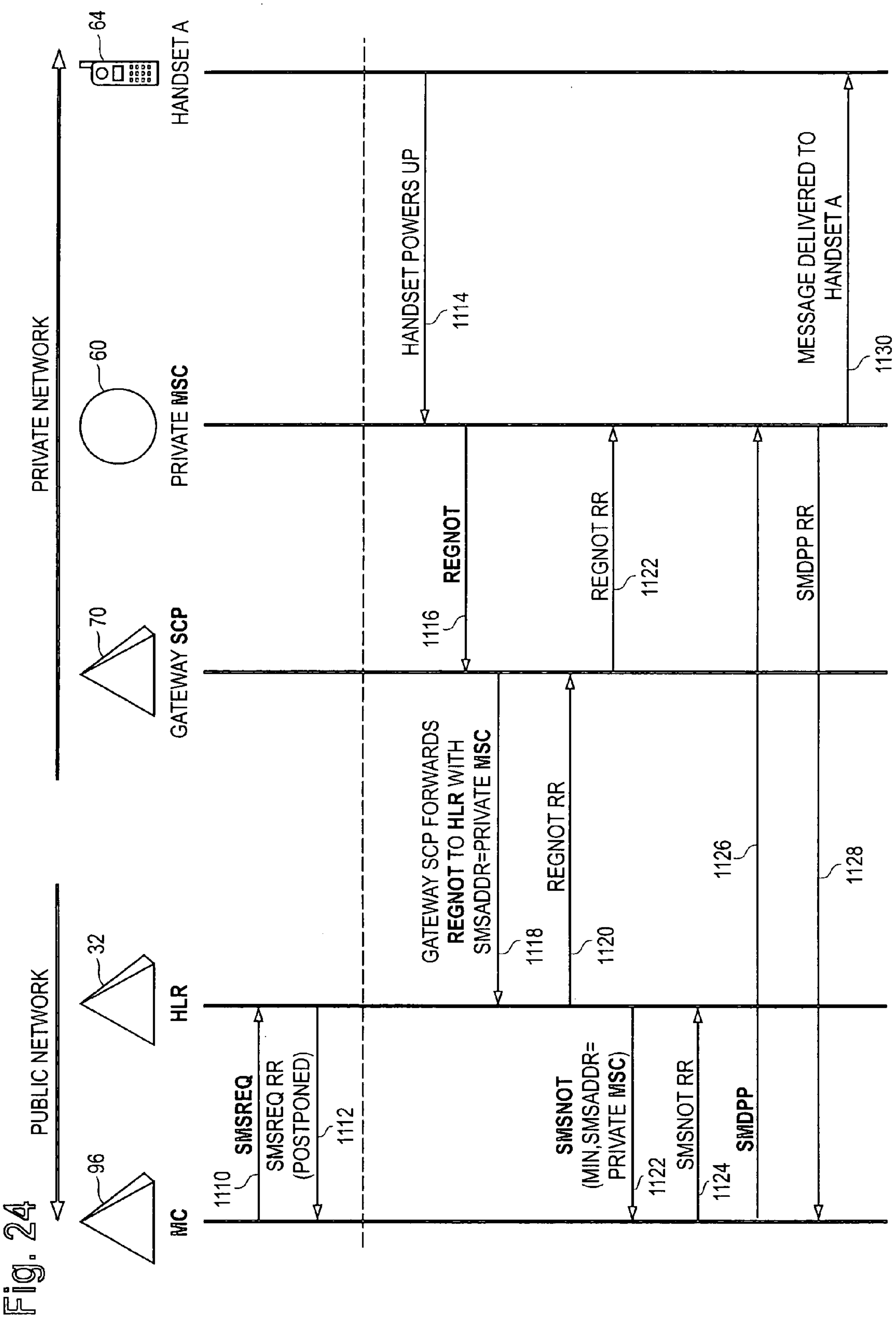
FIG. 24 is a simplified call flow diagram illustrating the process of delivering a short message to a mobile station when it is first inactive, and then active, in the private wireless network, in accordance with an exemplary embodiment of the present invention.

However, if Message Center 96 attempts to deliver a message to mobile station 64 when mobile station 64 is inactive, the delivery may be postponed until mobile station 64 becomes active, as shown in FIG. 24. Message center 96 sends to HLR 32 an SMSREQ message 1110 identifying mobile station 64 as the recipient. In this case, HLR 32 determines that mobile station 64 is inactive and, thus, sends an smsreq_rr message 1112 indicating that delivery should be postponed. The status of mobile station 64 changes once mobile station 64 registers. Thus, when mobile station 64 sends a power-up registration request signal while in the coverage area of private network 12, private MSC 60 sends a REGNOT message 1116 to Gateway SCP 70. Gateway SCP 70, in turn, sends to HLR 32 a REGNOT message 1118 that includes an SMSaddr for mobile station 64 as private MSC 60. As described above, the SMSaddr may correspond to private MSC 60, as shown in FIG. 23, or it may correspond to another network element, such as private BSC 20. HLR 32 sends a regnot_rr message 1120 back to Gateway SCP 70, and Gateway SCP 70 sends a regnot_rr message 1122 back to private MSC to complete the registration process.

With mobile station 64 now registered, HLR 32 sends an IS-41 SMS Notification ("SMSNOT") message 1122 to Message Center 96. SMSNOT message 1122 identifies mobile station 64 by its MIN and includes the SMSaddr for mobile station 64 obtained from registration. SMSNOT message 1122 notifies Message Center 96 that short messages intended for mobile station 64 may now be sent to the SMSaddr. Message Center 96 acknowledges with an IS-41 SMS Notification Return Result ("smsnot_rr") message 1124 to HLR 32. Message Center 96 then transmits the short messages in a SMDPP message 1126 to private MSC 60. Private MSC 60 acknowledges by sending a smdpp_rr message 1128 back to Message Center 96, and private MSC transmits a signal 1130 to mobile station 64 to deliver the short messages.

Voice Mail Notification

In preferred embodiments, private network 12 includes PBX 84, which, in turn, includes a voice mail system. In typical embodiments, PBX 84 may activate a user-discernable indicator, such as a light, on a user's wireline telephone to indicate that the user has voice mail on the PBX 84 voice mail system. In accordance with preferred embodiments of the present invention, a user of private network 12 may have both a wireline telephone, such as wireline telephone 86, and a mobile station, such as mobile station 64. Thus, the present invention may provide a user-discernable voice mail indication on the user's mobile station as well, and may do so whether the mobile station is operating in the coverage area of private network 12 or the coverage area of public network 14.

Figure 25:
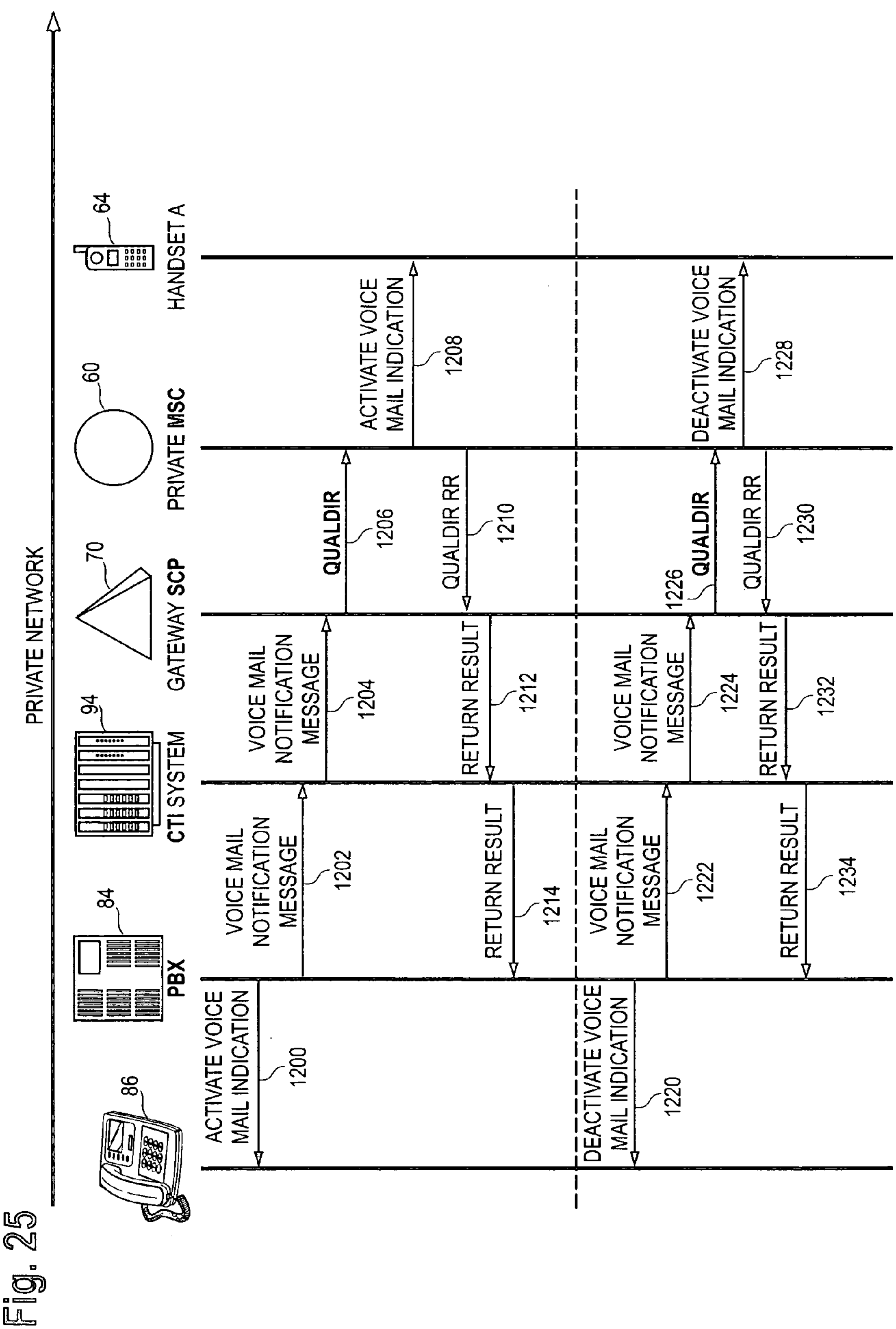
FIG. 25 is a simplified call flow diagram illustrating the process of delivering a voice mail notification to a mobile station operating in the private wireless network, in accordance with an exemplary embodiment of the present invention.

FIG. 25 illustrates a simplified exemplary call flow for the process of activating, and then de-activating, a voice mail indication on both wireline station 86 and mobile station 64, while mobile station 64 is being served by private MSC 60 in private network 12. When the voice mail system of PBX 84 receives a voice mail message for the user of wireline station 86 and mobile station 64, PBX 84 sends a signal 1200 to wireline station 86 to activate the voice mail indicator therein. Signal 1200 may, for example, cause a light on wireline station 86 to be lit. To reach mobile station 64, PBX 84 sends to CTI 94 a voice mail notification message 1202 that identifies mobile station 64. CTI 94, in turn, sends a voice mail notification message 1204 identifying mobile station 64 to Gateway SCP 70. Gateway SCP 70 retrieves the data record for mobile station 64 and determines, from its locator address, that it is being served by private MSC 60. Gateway SCP 70 then sends an IS-41 Qualification Directive ("QUALDIR") message 1206, identifying mobile station 64, to private MSC 60. In response, private MSC 60 causes a signal 1208 to be transmitted to mobile station 64 to activate its voice mail indication. The voice mail indication is typically a user-discernable indication such as a tone and/or a visible indication on the display of mobile station 64. Private MSC 60 then sends an IS-41 Qualification Directive Return Result ("qualdir_rr") message 1210 back to Gateway SCP 70. Gateway SCP 70, in turn, sends a return result message 1212 to CTI 94, and CTI 94 sends a return result message 1214 to PBX 84 to confirm delivery of the voice mail activation.

Once the voice mail has been read, PBX 84 typically deactivates the voice mail indications on wireline telephone 86 and mobile station 64, as shown in FIG. 23. The call flow is similar for activating the voice mail indication. PBX 84 sends a signal 1220 to wireline station 86 to deactivate the voice mail indication. PBX 84 also sends a voice mail notification message 1222 to CTI 94. CTI 94, in turn, sends a voice mail notification message 1224 to Gateway SCP 70, and Gateway SCP 70 sends a QUALDIR message 1226 to private MSC 60. In response, private MSC 60 sends a signal 1228 to mobile station 64 to deactivate the voice mail indication. Private MSC 60 also sends a qualdir_rr message back to Gateway SCP 70. Gateway SCP 70, in turn, sends a return result message 1232 back to CTI 94 and a return result message 1234 back to PBX 84.

Figure 26:
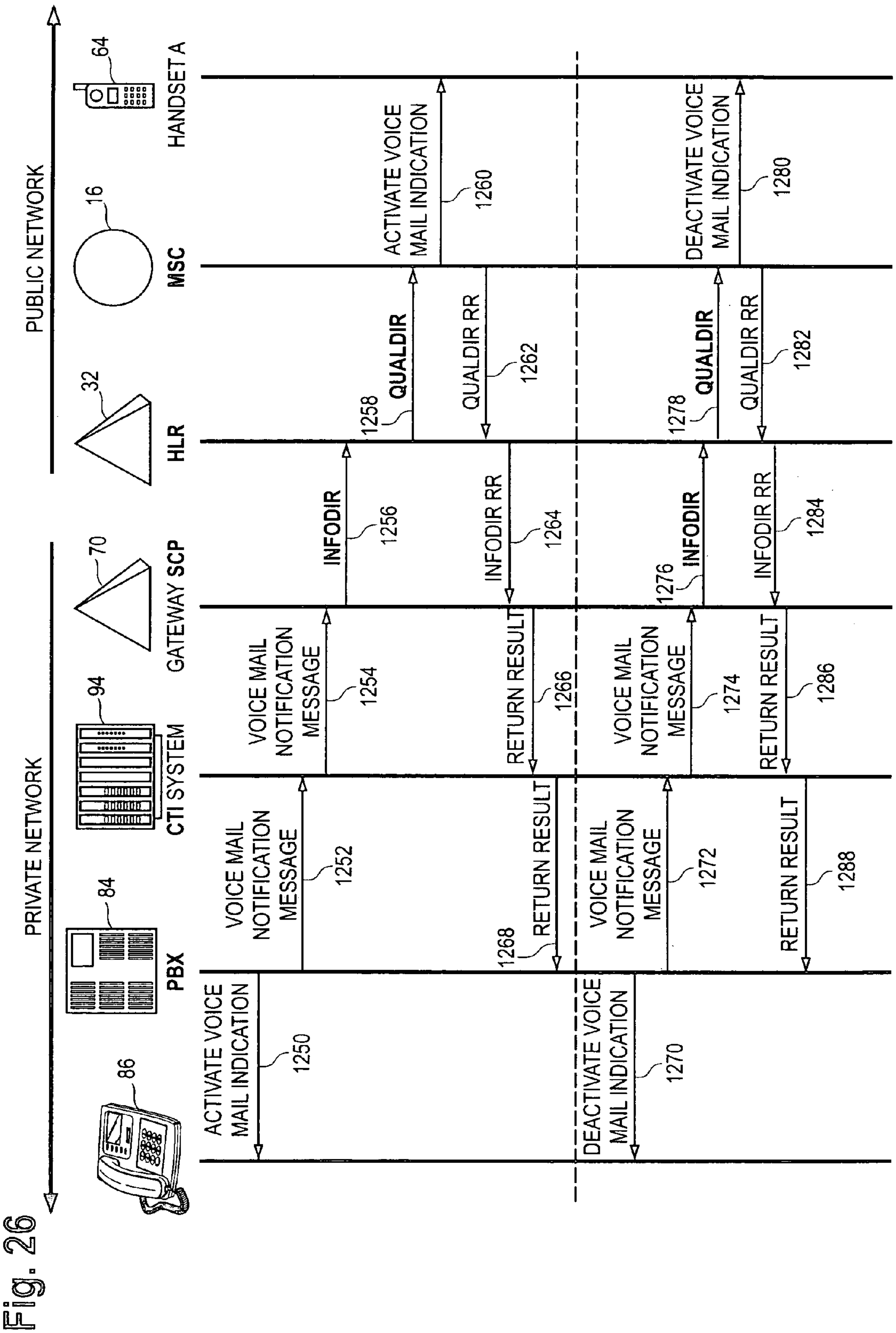
FIG. 26 is a simplified call flow diagram illustrating the process of delivering a voice mail notification to a mobile station operating in the public wireless network, in accordance with an exemplary embodiment of the present invention.

The voice mail notification may also reach mobile station 64 when it is being served by MSC 16 in the coverage area of public network 14, as shown in FIG. 26. As before, PBX 84 sends a signal to wireline station 86 to activate its voice mail indication, and PBX 84 also sends a voice mail notification message 1252 to CTI 94, which, in turn, sends a voice mail notification message 1254 to Gateway SCP 70. Messages 1252 and 1254 identify mobile station 64. In this case, Gateway SCP 70 does not have a locator address for mobile station 64, because mobile station 64 is not operating in the coverage area of private network 12. To reach mobile station 64, Gateway SCP 70 sends to HLR 32 an IS-41 Information Directive ("INFODIR") message 1256 that identifies mobile station 64. HLR 32 retrieves the data record for mobile station 64 and determines, from its locator address, that it is being served by MSC 16. Accordingly, HLR 32 sends a QUALDIR message 1258, identifying mobile station 64, to MSC 16, and MSC 16 causes a signal 1260 to be transmitted to mobile station 64 to activate its voice mail indication. MSC 16 also sends a qualdir_rr message 1262 to HLR 32, which, in turn, sends an IS-41 Information Directive Return Result ("infodir_rr") message 1264 to Gateway SCP 70. Gateway SCP 70 then sends a return result message 1266 to CTI 94, and CTI 94 sends a return result message 1268 to PBX 84 to confirm delivery of the voice mail notification to mobile station 64.

The process of deactivating the voice mail indication is similar. PBX 84 sends a signal 1270 to wireline station 86 to deactivate its voice mail indication. PBX 84 also sends a voice mail notification message 1272 to CTI 94, which, in turn sends a voice mail notification message 1274 to Gateway SCP 70. Gateway SCP 70 sends an INFODIR message 1276 to HLR 32, and HLR 32 sends a QUALDIR message 1278 to MSC 16. MSC 16 sends a signal 1280 to mobile station 64 to deactivate its voice mail indication. MSC 16 sends a qualdir_rr message 1282 back to HLR 32, and HLR 32 sends an infodir_rr message 1284 back to Gateway SCP 70. Gateway SCP 70 then sends a return result message 1286 to CTI 94, which, in turn, sends a return message 1288 to PBX 84 to confirm that the voice mail indication on mobile station 64 has been deactivated.

An exemplary embodiment of the present invention has been illustrated and described. It will be understood, however, that changes and modifications may be made to the invention without deviating from the spirit and scope of the invention, as defined by the following claims.

What is claimed is:

1. A private wireless network, to which private network mobile stations subscribe, integrated with a public wireless network, to which public network mobile stations subscribe, said private wireless network being able to provide wireless telecommunications services to at least one mobile station that subscribes to said private wireless network and to said public wireless network, said public wireless network having a public network subscriber database containing a public network data record for each of said public network mobile stations, including a first data record for said at least one mobile station, said public wireless network providing a public network coverage area within which said at least one mobile station can communicate with said public wireless network over an air interface, said public wireless network including a public mobile switching center (MSC) serving mobile stations operating in said public network coverage area, said private wireless network comprising:

- at least one base station providing a private network coverage area, said at least one mobile station being able to communicate with said at least one base station over an air interface when said at least one mobile station is operating in said private network coverage area;
- a switching system in communication with said at least one base station, said switching system including a private MSC serving mobile stations operating in said private network coverage area;
- a gateway service control point (SCP) in communication with said switching system, wherein said gateway SCP provides call processing instructions in response to queries from said switching system; and
- a private network subscriber database located in said gateway SCP, said private network subscriber database containing a private network data record for each of said private network mobile stations, including a second data record for said at least one mobile station.

2. The private wireless network of claim 1, wherein said public network subscriber database is located in a home location register (HLR).

3. The private wireless network of claim 1, wherein said first data record includes a first locator address for locating said at least one mobile station and said second data record includes a second locator address for locating said at least one mobile station.

4. The private wireless network of claim 3, wherein said first locator address identifies said gateway SCP and said second locator address identifies said switching system.

5. The private wireless network of claim 1, wherein said gateway SCP includes a plurality of service logic modules.

6. The private wireless network of claim 2, wherein said HLR includes a plurality of service logic modules.

7. The private wireless network of claim 1, wherein said switching system includes a second private MSC.

8. The private wireless network of claim 1, wherein said switching system includes a first private branch exchange (PBX).

9. The private wireless network of claim 8, wherein first PBX communicates with said gateway SCP via a computer telephony interface (CTI).

10. The private wireless network of claim 8, wherein said switching system includes a second PBX.

11. The private wireless network of claim 1, wherein said first data record includes a first service profile for said at least one mobile station and said second data record includes a second service profile for said at least one mobile station.

12. The private wireless network of claim 11, wherein said first service profile differs from said second service profile.

13. The private wireless network of claim 1, wherein said private network wireless coverage area overlaps said public network coverage area.

* * * * *